United States Patent
Asenjo et al.

(10) Patent No.: US 10,135,705 B2
(45) Date of Patent: *Nov. 20, 2018

(54) INDUSTRIAL INTERNET OF THINGS DATA PIPELINE FOR A DATA LAKE

(71) Applicant: Rockwell Automation Technologies, Inc., Mayfield Heights, OH (US)

(72) Inventors: Juan L. Asenjo, Timberlake, OH (US); Francisco P. Maturana, Lyndhurst, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 236 days.

This patent is subject to a terminal disclaimer.

(21) Appl. No.: 15/199,869

(22) Filed: Jun. 30, 2016

(65) Prior Publication Data

US 2018/0006913 A1    Jan. 4, 2018

(51) Int. Cl.
| | | |
|---|---|---|
| *H04L 12/26* | (2006.01) | |
| *H04L 29/08* | (2006.01) | |
| *H04L 12/24* | (2006.01) | |

(52) U.S. Cl.
CPC .......... *H04L 43/065* (2013.01); *H04L 41/06* (2013.01); *H04L 43/045* (2013.01); *H04L 67/10* (2013.01); *H04L 67/12* (2013.01)

(58) Field of Classification Search
USPC ................................ 709/203, 200, 217, 224
See application file for complete search history.

(56) References Cited

U.S. PATENT DOCUMENTS

| | | | |
|---|---|---|---|
| 2010/0010968 A1* | 1/2010 | Redlich ............. | G06F 17/30672 707/E17.014 |
| 2010/0198736 A1* | 8/2010 | Marino .............. | G01N 21/3504 705/308 |
| 2011/0238381 A1* | 9/2011 | Edwards ................ | G06Q 10/08 702/188 |
| 2013/0062288 A1* | 3/2013 | Spani ........................ | E03F 5/14 210/709 |

(Continued)

OTHER PUBLICATIONS

Apache Kafka. "Kafka 0.10.0 Documentation" published online at [http://kafka.apache.org/documentation.html], retrieved on Jun. 30, 2016, 118 pages.

(Continued)

*Primary Examiner* — El Hadji M Sall
(74) *Attorney, Agent, or Firm* — Amin, Turocy & Watson, LLP

(57) ABSTRACT

A cloud-based analytics system streams industrial data from customer facilities to a cloud platform as torrential data streams, and performs analytics on the data contained in the data streams based on a selected set of rules. The rules can be designed to diagnose current or potential issues, to monitor for alarm conditions, or to perform other types of analytics. One or more data pipelines migrate data from plant facilities to a data lake residing on the cloud platform. Data streams can be segregated according to customer, and can further be segregated according to plant facility, production area, or any other suitable classification. Each data stream has an associated manifest that identifies the set of rules to be used to process data in each data stream, allowing selected rules to be applied to each data stream in an ad hoc manner.

20 Claims, 23 Drawing Sheets

(56) References Cited

U.S. PATENT DOCUMENTS

| | | | | |
|---|---|---|---|---|
| 2013/0275187 A1* | 10/2013 | Patel | ................ | G06Q 10/06398 |
| | | | | 705/7.42 |
| 2014/0040182 A1* | 2/2014 | Gilder | ............... | G06F 17/30578 |
| | | | | 707/602 |
| 2015/0281453 A1* | 10/2015 | Maturana | ............ | H04M 3/5233 |
| | | | | 379/265.12 |

OTHER PUBLICATIONS

EMC Corporation. "Data Lakes for Data Science. Integrating Analytics Tools with Sared Infrastructure for Big Data" May 2015, 24 pages.

\* cited by examiner

HARMONIZATION

| Application ID | Description | Time Stamp | Time Zone | Technology | Status | Mode | Filter Key | Rework |
|---|---|---|---|---|---|---|---|---|
| Application ID | Description | Time Stamp | Time Zone | Technology | Status | Mode | Filter Key | Rework |
| Application ID | Description | Time Stamp | Time Zone | Technology | Status | Mode | Filter Key | Rework |
| Application ID | Description | Time Stamp | Time Zone | Technology | Status | Mode | Filter Key | Rework |
| ... | | | | | | | | |
| Application ID | Description | Time Stamp | Time Zone | Technology | Status | Mode | Filter Key | Rework |

FIG. 8

```
<Manifest xmlns:xsd="http://www.w3.org/2001/XMLSchema"
    xmlns:xsi="http://www.w3.org/2001/XMLSchema-instance">
    <ReleaseDate>2012-05-30T17:16:07.6290869-05:00</ReleaseDate>
    <MetricManifest>F:\\Shweta_Development\\Manifest\\MetricsManifest.xml</MetricManifest>
  -<Customers>
    -<Customer>
      <CustomerName>Rockwell CMS</CustomerName>
      <CustomerId>1001</CustomerId>
      -<Sites>
      -<Site>
        <SiteId>101</SiteId>
        <SiteName>Rockwell Office</SiteName>
        -<VSEs>
          -<VSE>
            <VSEId>1</VSEId>
            <VSEName>Test Machine</VSEName>
            <VSETagManifest>F:\\Shweta_Development\\Manifest\\TagManifest.xml</VSETagManifest>
            -<MessageTypes>
              -<MessageType>
                <MessageTypeName>Alarms</MessageTypeName>
                <MessageTypeId>0</MessageTypeId>
                -<AssemblyInfo>
                  -<ProcessAssembly>
                    <ProcessId>100011</ProcessId>

<Namespace>CoreProcessAssembly.AlarmDataProcess</Namespace>

<AssemblyFileName>CoreProcessAssembly.dll</AssemblyFileName>
                    <ReleaseDate>2012-05-30T17:16:08.2760869-05:00</ReleaseDate>
                  </ProcessAssembly>
                </AssemblyInfo>
              </MessageType>
              -<MessageType>
                <MessageTypeName>Historical</MessageTypeName>
                <MessageTypeId>1</MessageTypeId>
                -<AssemblyInfo>
                  -<ProcessAssembly>
                    <ProcessId>100011</ProcessId>

<Namespace>CoreProcessAssembly.HistoricalDataProcess</Namespace>
```

FIG. 12

```
<TagManifestReleaseDate="2012-05-30T017:16:07.6290869-05:00">
-<AnalyticsSystem>
  -<ControlSystems>
    -<ControlSystem ID = "1">
      -<Controllers>
        <Controller ID = "1.0" Project = "chassis1" connnectedTo = "N1" />
        <Controller ID = "2.0" Project = "modularPLC" connnectedTo = "N2" />
      </Controllers>
      -<Networks>
        <Network ID = "N1" Name = "TestNetwork1" />
        <Network ID = "N2" Project = "TestNetwork2" />
      </Networks>
    </ControlSystem>
    +<ControlSystem ID = "1">
  </ControlSystems>
  -<Applications>
    -<Application ID = "1.1" Name = "TurboExpander1">
      -<Process>
        <Process ID = "1" Name = "NetPower" />
        <Process ID = "2" Name = "CycleEfficiency" />
        <Process ID = "3" Name = "PowerGuarantee" />
      </Process>
    </Application>
    +<Application ID = "1.2" Name = "TurboExpander2">
    +<Application ID = "1.3" Name = "TurboExpander3">
  </Applications>
  -<Tags>
    <Tag Name = "GEN_REAL_POWER" Units = "MW" ownerProcessID = "1,2,3" ownerControllerID = "1.0" />
    <Tag Name = "MW_TOTAL_480_SUPPLY" Units = "MW" ownerProcessID = "1,2,3" ownerControllerID = "2.0" />
    <Tag Name = "WHRU_1_T_OIL_OUTLET_FLOW" Units = "m2/hr" ownerProcessID = "2,3" ownerControllerID = "1.0" />
    <Tag Name = "WHRU_1_T_OIL_IN_TEMP" Units = "C" ownerProcessID = "3" ownerControllerID = "2.0" />
    <Tag Name = "WHRU_1_T_OIL_OUTLET_TEMP" Units = "C" ownerProcessID = "2,3" ownerControllerID = "1.0" />
    <Tag Name = "WHRU_2_T_OIL_OUTLET_FLOW" Units = "m3/hr" ownerProcessID = "2,3" ownerControllerID = "2.0" />
    <Tag Name = "WHRU_2_T_OIL_IN_TEMP" Units = "C" ownerProcessID = "2" ownerControllerID = "2.0" />
    <Tag Name = "WHRU_1_T_OIL_OUTLET_TEMP" Units = "C" ownerProcessID = "2,3" ownerControllerID = "1.0" />
    <Tag Name = "AMBIENT_AIR_TEMP" Units = "C" ownerProcessID = "3" ownerControllerID = "1.0" />
    <Tag Name = "T_OIL_SUPPLY_TO_ORC_TEMP" Units = "C" ownerProcessID = "3" ownerControllerID = "1.0" />
    <Tag Name = "T_OIL_SUPPLY_RETURN_FROM_ORC_TEMP" Units = "C" ownerProcessID = "3" ownerControllerID = "2.0" />
  </Tags>
</AnalyticsSystem>
</TagManifest>
```

FIG. 13

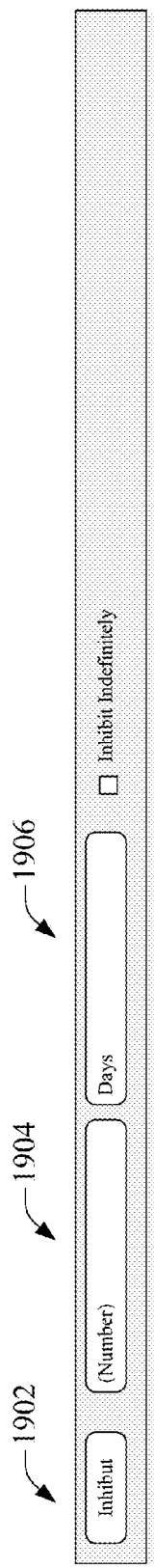
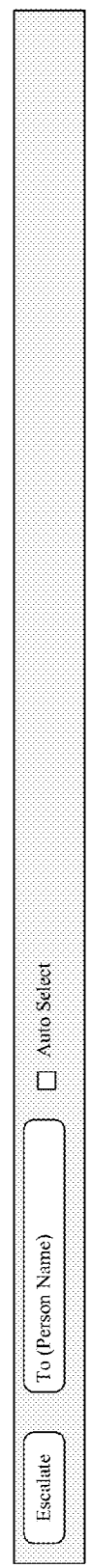
FIG. 19A
FIG. 19B

INDUSTRIAL INTERNET OF THINGS DATA PIPELINE FOR A DATA LAKE

BACKGROUND

The subject matter disclosed herein relates generally to industrial automation, and, more particularly, collection and analysis of industrial data.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for collecting and analyzing industrial data is provided, comprising a data streaming component configured to transfer industrial data collected from one or more industrial devices of an industrial enterprise to a cloud platform as a data stream, wherein the data stream is associated with the industrial enterprise; a harmonization component configured to add harmonization envelop data to respective data items of the data stream to yield harmonized data conforming to a common data schema; and an analytics component configured to reference a manifest associated with the industrial enterprise, to retrieve one or more analytic rules identified by the manifest from a rules store, and to apply the one or more analytic rules to one or more of the data items of the data stream to yield one or more analytic results, wherein the data streaming component is further configured to store the data items and the one or more analytic results on cloud-based storage.

Also, one or more embodiments provide a method for monitoring industrial data, comprising transferring, by a system comprising at least one processor, industrial data collected from one or more industrial devices of an industrial enterprise to cloud-based storage as a data stream, wherein the data stream is associated with the industrial enterprise; appending, by the system, harmonization envelope data to data items of the data stream to yield harmonized data that conforms to a common data schema; retrieving, by the system, a subset of analytic rules stored on cloud-based rule storage, wherein the subset of the analytic rules are identified by a manifest associated with the data stream; processing, by the system, one or more of the data items in accordance with the one or more analytic rules to yield one or more analytic results; and storing, by the system, the data items and the one or more analytic results on the cloud-based storage.

Also, according to one or more embodiments, a non-transitory computer-readable medium is provided having stored thereon instructions that, in response to execution, cause a system to perform operations, the operations comprising transferring industrial data collected from one or more industrial devices of an industrial enterprise to cloud-based storage as a data stream, wherein the data stream is associated with the industrial enterprise; appending harmonization envelope data to data items of the data stream to yield harmonized data that conforms to a common data schema; referencing a manifest associated with the data stream to identify a subset of analytic rules stored on cloud-based rule storage; processing one or more of the data items in accordance with the subset of analytic rules to yield one or more analytic results; and storing the data items and the one or more analytic results on cloud-based storage.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 8 is a data format diagram illustrating example harmonization envelop.

FIG. 12 is an example system manifest.

FIG. 13 is an example tag manifest.

FIGS. 19A and 19B are example Action Configuration displays that can be used to set an action to be performed by a rule.

DETAILED DESCRIPTION

Figure 1:
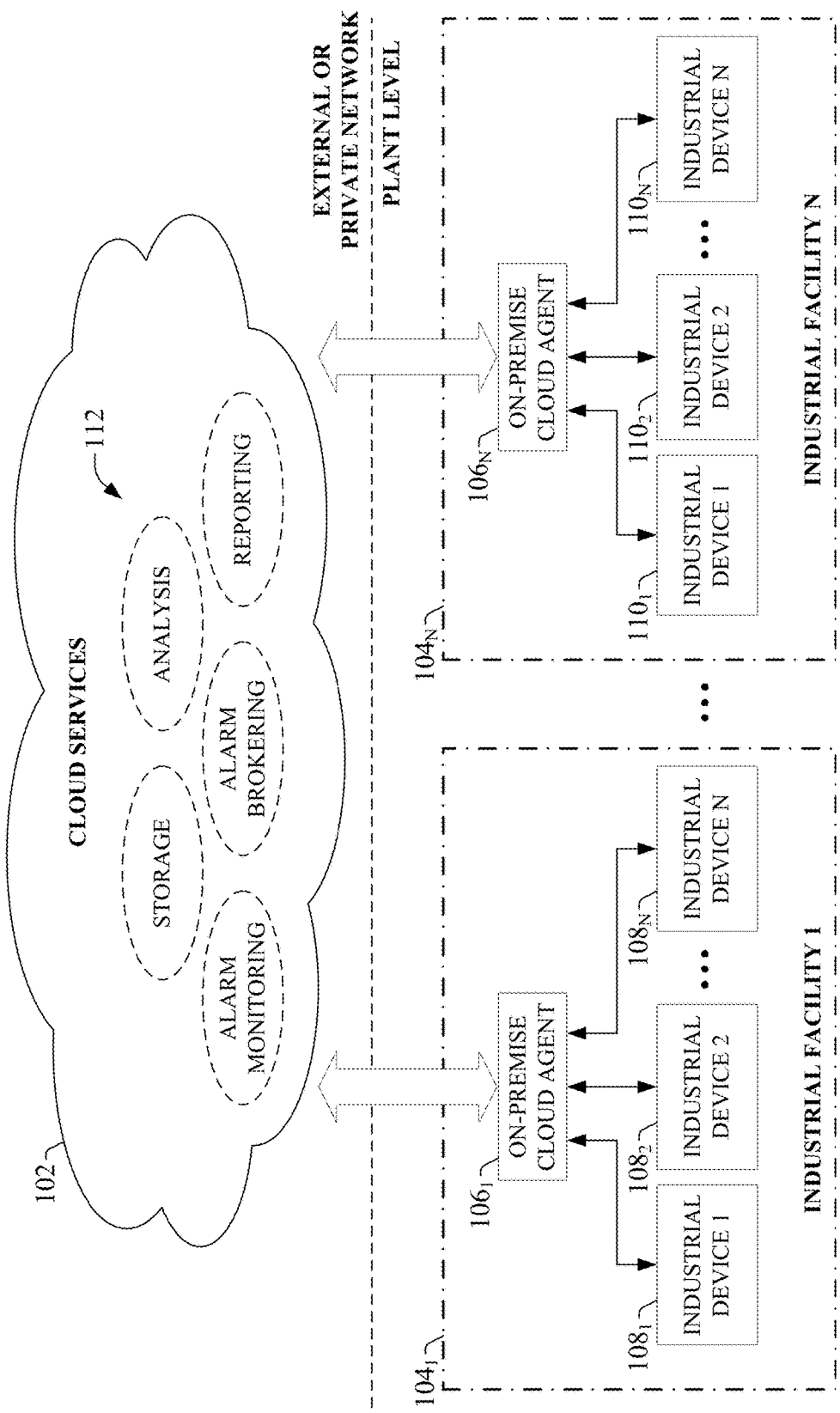
FIG. 1 illustrates a high-level overview of an industrial enterprise that leverages cloud-based services.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such programming structures.

Because of the large number of system variables that must be monitored and controlled in near real-time, industrial automation systems often generate vast amounts of near real-time data. In addition to production statistics, data relating to machine health, alarm statuses, operator feedback (e.g., manually entered reason codes associated with a downtime condition), electrical or mechanical load over time, and the like are often monitored, and in some cases recorded, on a continuous basis. This data is generated by the many industrial devices that make up a typical automation system, including the industrial controller and its associated I/O, telemetry devices for near real-time metering, motion control devices (e.g., drives for controlling the motors that make up a motion system), visualization applications, lot traceability systems (e.g., barcode tracking), etc. Moreover, since many industrial facilities operate on a 24-hour basis, their associated automation systems can generate a vast amount of potentially useful data at high rates. The amount of generated automation data further increases as additional plant facilities are added to an industrial enterprise.

Industrial automation systems that make up a given industrial enterprise are typically maintained by on-site plant personnel (e.g., maintenance personnel, plant engineers, etc.). Given the diversity and complexity of industrial assets that make up a given industrial system, many device or system maintenance issues require a level of specialized device expertise not possessed by on-site maintenance personnel, who may be responsible for a wide range of disparate industrial assets and therefore possess a more generalized knowledge of their assets. Consequently, industrial enterprises generally rely, to varying degrees, on outside expert support personnel for assistance with certain technical support issues.

Maintenance personnel wishing to obtain technical assistance to resolve a device failure, a performance issue, or an alarm incident must typically contact a remote technical support person by phone and provide relevant information about their particular industrial device, software, system configuration, etc. Providing the technical support personnel with a complete set of relevant information required to resolve a maintenance issue sometimes requires a level of knowledge about the customer's system that on-site plant personnel may not possess. Moreover, on-premise maintenance personnel may not know the correct technical support person for assistance in solving a particular alarm incident. This is a particular problem in the case of custom-built industrial systems, which are often designed and built by original equipment manufacturers (OEMs) using devices supplied by a separate equipment vendor (e.g., industrial controllers, motor drives, etc.). Consequently, the most suitable technical support entity for addressing a particular performance issue or abnormality with the custom machine may not always be clear to the machine owner.

To address these and other issues, one or more embodiments of the present disclosure relate to a cloud-based system that streams industrial data from customer facilities to a cloud platform as data streams, and performs analytics on the data contained in the data streams based a set of rules. The rules can be designed to diagnose current or potential issues, and the system can interface with an alarm brokering system that assists in locating suitable technical support personnel in response to detected incidents. The system architecture includes one or more data pipelines that migrate data from plant facilities to a data lake residing on the cloud platform. For systems in which data from multiple different industrial enterprises is monitored, the data streams can be segregated by industrial enterprise (customer), and can further be segregated according to any other suitable criterion (e.g., plant facility, production area, etc.). Each data stream has an associated manifest that identifies the set of rules to be used to process data in each data stream, allowing selected rules to be applied to each data stream in an ad hoc manner.

The industrial uptime system described herein can execute as a service or set of services on a cloud platform. FIG. 1 illustrates a high-level overview of an industrial enterprise that leverages such cloud-based services. The enterprise comprises one or more industrial facilities 104, each having a number of industrial devices 108 and 110 in use. The industrial devices 108 and 110 can make up one or more automation systems operating within the respective facilities 104. Exemplary automation systems can include, but are not limited to, batch control systems (e.g., mixing systems), continuous control systems (e.g., PID control systems), or discrete control systems. Industrial devices 108 and 110 can include such devices as industrial controllers (e.g., programmable logic controllers or other types of programmable automation controllers); field devices such as sensors and meters; motor drives; operator interfaces (e.g., human-machine interfaces, industrial monitors, graphic terminals, message displays, etc.); industrial robots, barcode markers and readers; vision system devices (e.g., vision cameras); smart welders; or other such industrial devices.

Exemplary automation systems can include one or more industrial controllers that facilitate monitoring and control of their respective processes. The controllers exchange data with the field devices using native hardwired I/O or via a plant network such as Ethernet/IP, Data Highway Plus, ControlNet, Devicenet, or the like. A given controller typically receives any combination of digital or analog signals from the field devices indicating a current state of the devices and their associated processes (e.g., temperature, position, part presence or absence, fluid level, etc. . . . ), and executes a user-defined control program that performs automated decision-making for the controlled processes based on the received signals. The controller then outputs appropriate digital and/or analog control signaling to the field devices in accordance with the decisions made by the control program. These outputs can include device actuation signals, temperature or position control signals, operational commands to a machining or material handling robot, mixer control signals, motion control signals, and the like. The control program can comprise any suitable type of code used to process input signals read into the controller and to control output signals generated by the controller, including but not limited to ladder logic, sequential function charts, function block diagrams, structured text, or other such platforms.

Although the exemplary overview illustrated in FIG. 1 depicts the industrial devices 108 and 110 as residing in fixed-location industrial facilities 104, the industrial devices 108 and 110 may also be part of a mobile control application, such as a system contained in a truck or other service vehicle.

According to one or more embodiments, on-premise cloud agents 106 can collect data from industrial devices 108 and 110—or from other data sources, including but not limited to data historians, business-level systems, etc.—and send this data to cloud platform 102 for processing and storage. Cloud platform 102 can be any infrastructure that allows cloud services 112 to be accessed and utilized by cloud-capable devices. Cloud platform 102 can be a public cloud accessible via the Internet by devices having Internet connectivity and appropriate authorizations to utilize the services 112. In some scenarios, cloud platform 102 can be provided by a cloud provider as a platform-as-a-service (PaaS), and the services 112 (such as the alarm annunciation brokering system described herein) can reside and execute on the cloud platform 102 as a cloud-based service. In some such configurations, access to the cloud platform 102 and the services 112 can be provided to customers as a subscription service by an owner of the services 112. Alternatively, cloud platform 102 can be a private or semi-private cloud operated internally by the enterprise, or a shared or corporate cloud environment. An exemplary private cloud can comprise a set of servers hosting the cloud services 112 and residing on a corporate network protected by a firewall.

Cloud services 112 can include, but are not limited to, data storage, data analysis, control applications (e.g., applications that can generate and deliver control instructions to industrial devices 108 and 110 based on analysis of real-time system data or other factors), alarm monitoring and expertise brokering services, visualization applications such as the cloud-based operator interface system described herein, reporting applications, Enterprise Resource Planning (ERP) applications, notification services, or other such applications. Cloud platform 102 may also include one or more object models to facilitate data ingestion and processing in the cloud. If cloud platform 102 is a web-based cloud, cloud agents 106 at the respective industrial facilities 104 may interact with cloud services 112 directly or via the Internet. In an exemplary configuration, the industrial devices 108 and 110 connect to the on-premise cloud agents 106 through a physical or wireless local area network or radio link. In another exemplary configuration, the industrial devices 108 and 110 may access the cloud platform 102 directly using integrated cloud agents.

Ingestion of industrial device data in the cloud platform 102 can offer a number of advantages particular to industrial automation. For one, cloud-based storage offered by the cloud platform 102 can be easily scaled to accommodate the large quantities of data generated daily by an industrial enterprise. Moreover, multiple industrial facilities at different geographical locations can migrate their respective automation data to the cloud for aggregation, collation, collective analysis, visualization, and enterprise-level reporting without the need to establish a private network between the facilities. Cloud agents 106 can be configured to automatically detect and communicate with the cloud platform 102 upon installation at any facility, simplifying integration with existing cloud-based data storage, analysis, or reporting applications used by the enterprise. In another example application, cloud-based diagnostic applications can monitor the health of respective automation systems or their associated industrial devices across an entire plant, or across multiple industrial facilities that make up an enterprise. Cloud-based lot control applications can be used to track a unit of product through its stages of production and collect production data for each unit as it passes through each stage (e.g., barcode identifier, production statistics for each stage of production, quality test data, abnormal flags, etc.). Moreover, cloud based control applications can perform remote decision-making for a controlled industrial system based on data collected in the cloud from the industrial system, and issue control commands to the system via the cloud agent. These industrial cloud-computing applications are only intended to be exemplary, and the systems and methods described herein are not limited to these particular applications. The cloud platform 102 can allow software vendors to provide software as a service, removing the burden of software maintenance, upgrading, and backup from their customers.

Figure 2:
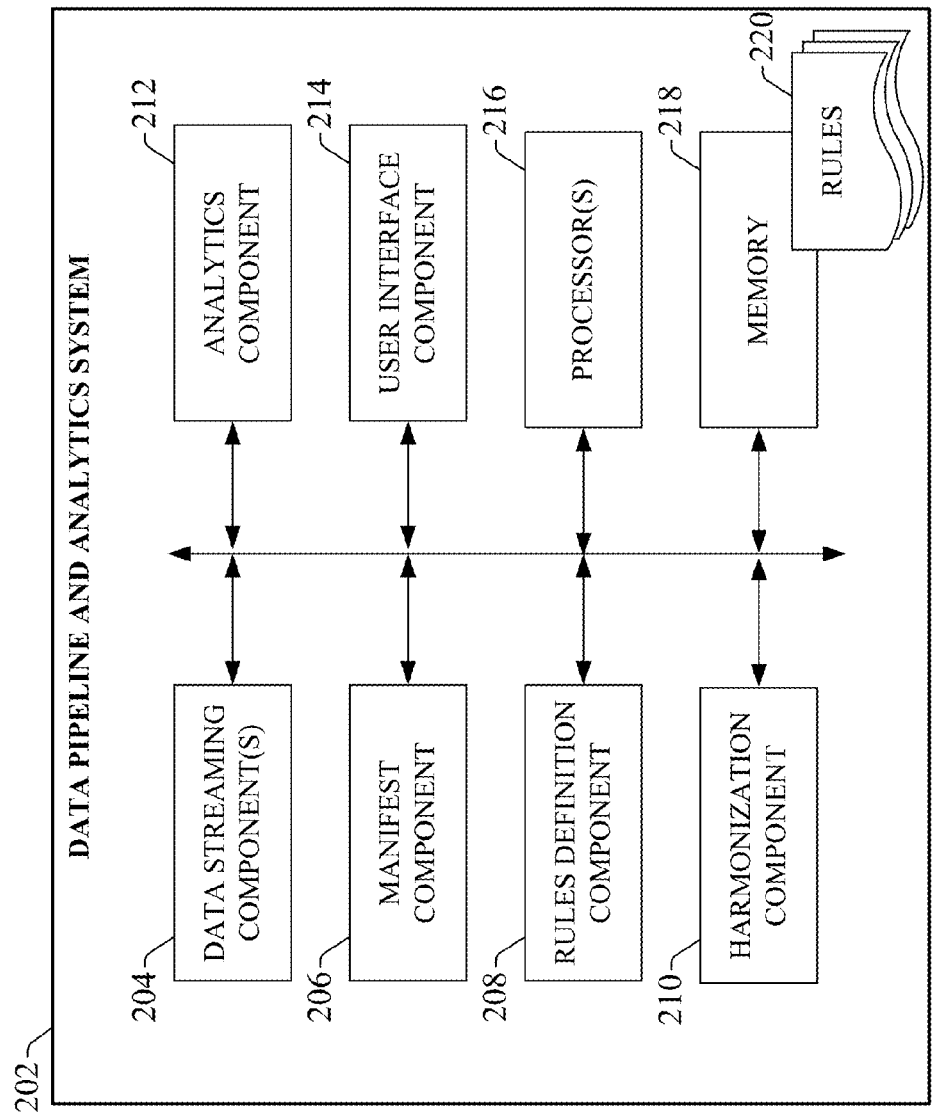
FIG. 2 is a block diagram of an example data pipeline and analytics system.

FIG. 2 is a block diagram of an example data pipeline and analytics system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Data pipeline and analytics system 202 can include one or more data streaming components 204, a manifest assembly component 206, a rules definition component 208, a harmonization component 210, an analytics component 212, a user interface component 214, one or more processors 216, and memory 218. In various embodiments, one or more of the data streaming component(s) 204, manifest component 206, rules definition component 208, harmonization component 210, analytics component 212, user interface component 214, the one or more processors 216, and memory 218 can be electrically and/or communicatively coupled to one another to perform one or more of the functions of the data pipeline and analytics system 202. In some embodiments, components 204, 206, 208, 210, 212, and 214 can comprise software instructions stored on memory 218 and executed by processor(s) 216. Data pipeline and analytics system 202 may also interact with other hardware and/or software components not depicted in FIG. 2. For example, processor(s) 216 may interact with one or more external user interface devices, such as a keyboard, a mouse, a display monitor, a touchscreen, or other such interface devices.

The one or more data streaming components 204 can be configured to manage migration of data from industrial facilities to the cloud platform. In one or more embodiments, the system can facilitate migration of data from industrial data sources on the plant floor using produce clients and consume clients, which yield torrential data streams from the plant floor to a data lake on the cloud platform. The manifest component 206 can be configured to create, update, and manage customer-specific manifests on the cloud platform. The manifests define and implement customer-specific processing of the data streams in terms of one or more defined processing rules. The rules definition component 208 can be configured to process user input that defines the one or more rules (e.g., rules 220) and store these rules in a rules library for invocation by the customer-specific manifests.

The harmonization component 210 can be configured to apply a harmonization envelop to incoming data (e.g., industrial alarm and event data) received via the data streams, thereby normalizing data from multiple different sources so that the data can be processed in a consistent manner by the rules created by the rules definition component 208 and invoked by the manifests. Analytics component 212 can be configured to process harmonized data received via the data streams in accordance with one or more rules invoked by the manifests associated with the respective data streams. The user interface component 214 can be configured to exchange information between the system 202 and a client device associated with an administrator, technical expert, system manager, a supervisor, or another authorized user of the data pipeline and analytics system 202. To this end, the user interface component 214 can be configured to serve user interface screens to the client device that allow the user to view information stored or generated by the system 202 (e.g., rules definition screens, alarm status information, expert information, alarm service histories, etc.) and to send information to the system 202 (e.g., rules definitions, service acknowledgements, availability information, contact information, etc.).

The one or more processors 216 can perform one or more of the functions described herein with reference to the systems and/or methods disclosed. Memory 218 can be a computer-readable storage medium storing computer-executable instructions and/or information for performing the functions described herein with reference to the systems and/or methods disclosed.

Figure 3:
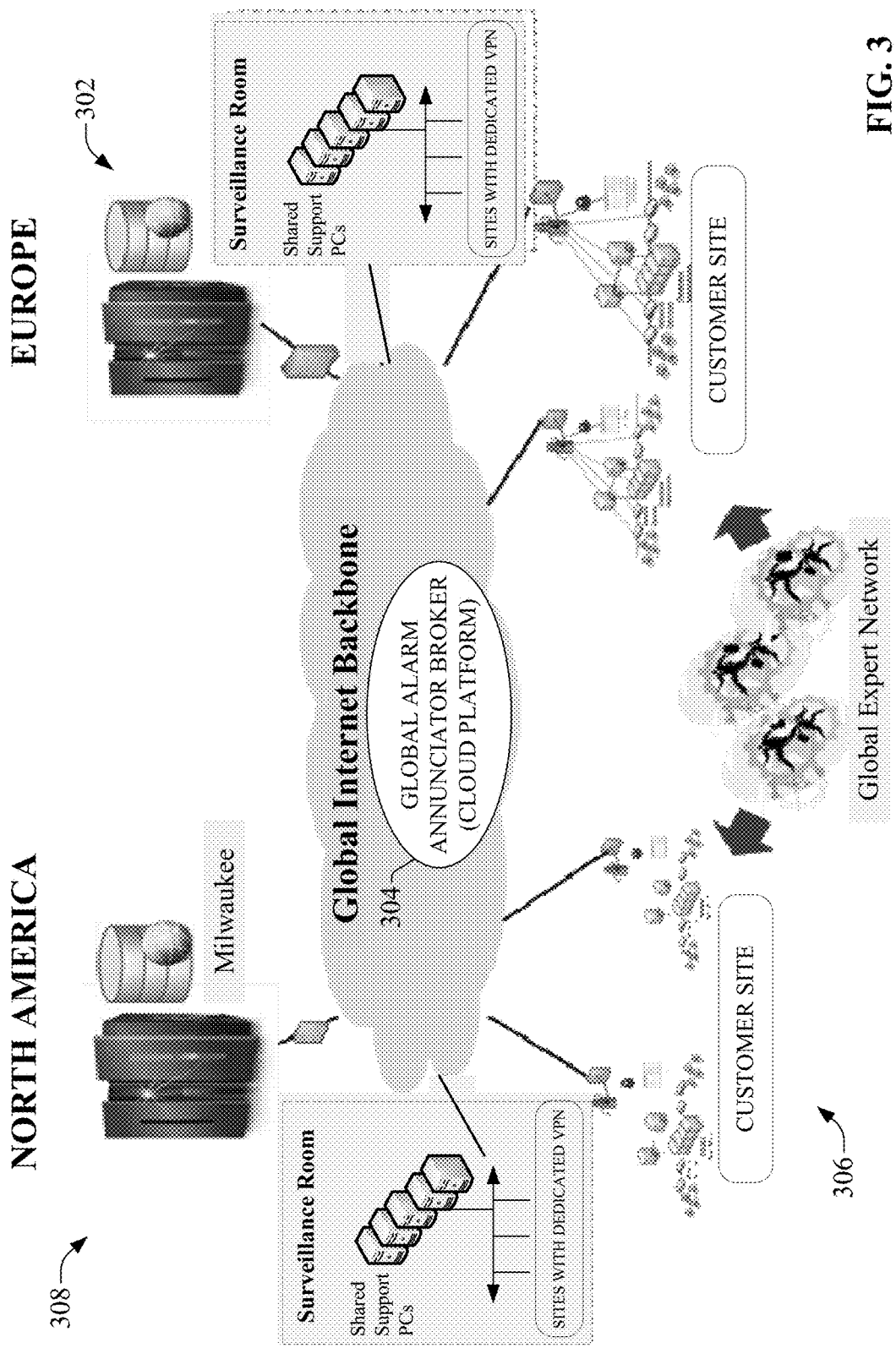
FIG. 3 is a high-level diagram of an example cloud-based infrastructure for a global alarm annunciation broker.

In some implementations, the industrial data pipeline and analytics system described herein can be used in connection with a global alarm annunciation broker that assists in locating and contacting suitable technical support personnel in response to detected alarm incidents at a plant facility. FIG. 3 is a high-level diagram of an example cloud-based infrastructure for a global alarm annunciation broker. The broker system 304 is configured to search a global expert network for appropriate technical support resources in response to detecting alarm conditions at various customer sites 306 (e.g., industrial facilities) requiring expert assistance. The broker system 304 employs a "follow-the-sun"

approach to identifying an available technical support resource as quickly as possible to address a detected alarm event. For example, when an alarm event is identified based on analysis of harmonized alarm batches received via the data streams described herein, the broker system 304 first performs a search of local technical support resources within the same geographical region from which the alarm was received. If no suitable local technical support resource is found, or if local technical support experts are not available (e.g., due to the time at which the alarm event occurred), the broker system 304 can expand the technical support search to other geographical regions. For example, the broker system 304 may generate a technical support ticket for an alarm event detected at a European facility during an overnight shift. In this scenario, the broker system 304 may initially perform a technical support search that is limited to Europe. However, since the alarm event was generated during the overnight shift, European technical experts 302 capable of assisting with the alarm event may not be available at that time. The system can make a determination regarding availability of technical support personnel based on availability data maintained on a cloud-based expert database. Since no suitable technical support experts are available in Europe at the time the alarm event was detected, the broker system 304 can extend the search for a technical resource to a region in another time zone—e.g., North America—where technical support experts 308 are more likely to be available at that time. In general, the cloud platform serves as a seamless conduit to realize these inter-regional connections.

In general, broker system 304 responds to detected alarm conditions by first searching local support resources, and scaling up if local resources cannot be found or are not available at the particular time and zone of need. This process of scaling up can eventually move across regions. Every brokering action depends on a set of rules that specified for respective customers (e.g. industrial enterprises comprising one or more industrial sites). The broker system 304 leverages a rules engine to process various customer-level application rules, where the rules engine encodes brokering intelligence. In an example scenario, the broker system 304 may try to match technical experts to an alarm event in the European region but cannot find support resources at that time in Europe. However, the broker system 304 may then find technical support expertise capable of handling the issue in North America at that time. This high-level rule, applicable to all managed cases, can specify that an alarm event originating in the European region is to be matched to a resource in the North American region until a local resource acknowledges the request for local servicing.

The Internet or cloud platform is a seamless conduit that realizes these inter-regional connections. The subscription system that connects the data lake with the broker system 304 permits this type of global reach. An expert-level database partitions expert-level data to help the broker system 304 to perform incremental search and selection of matching resources to serve alarm events in an order that is specified by application-level and meta-level rules.

Figure 4:
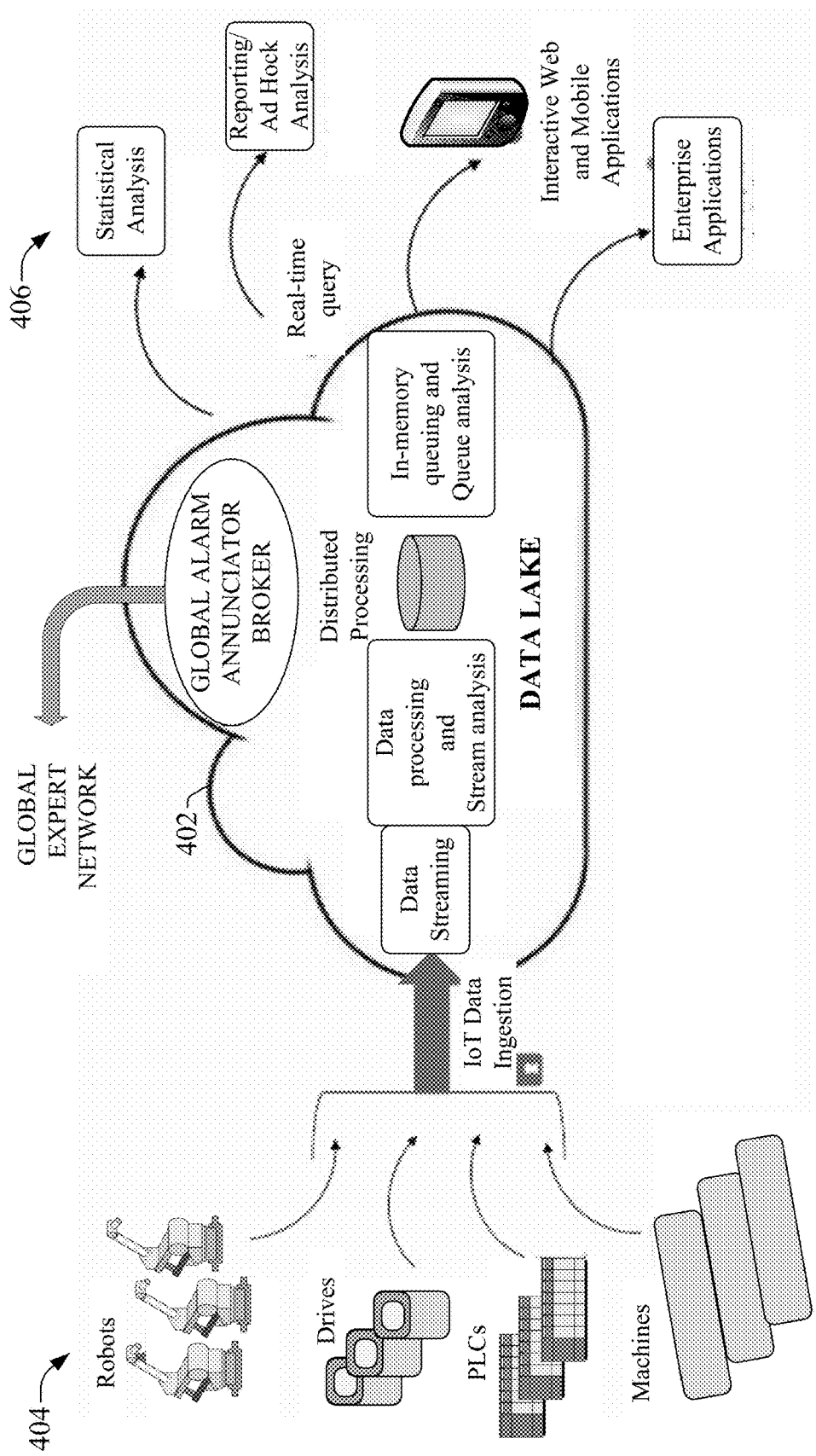
FIG. 4 is a high-level diagram illustrating data streaming and analysis of industrial data on a data lake.

The pipeline and analysis architecture described herein can implement a subscription layer that harmonizes and pushes alarm data and other types of data from industrial sites to the data lake leveraged by broker system 304, which will associate alarms and alarm patterns with technical service support for the various industrial sites. The pipeline and analytics system 202 can migrate data from various industrial sites as distinct data and apply customer-specific rules to each data stream for various purposes prior to storage on the cloud platform. In addition to alarm brokering, other types of cloud-based analysis can be performed on the data to support a number of different applications. To facilitate system flexibility and scalability, the data streaming and analytics can be performed on a data lake, which allows heterogeneous data to be stored in a raw format without extensive preprocessing (e.g., extract transform load, or ETI, processing). FIG. 4 is a high-level diagram illustrating data streaming and analysis of industrial data on a data lake according to one or more embodiments. In this example, data lake 402 resides on a cloud infrastructure (e.g., a private cloud, or a public cloud that offers infrastructure-as-a-service).

The data pipeline and analytics system 202 works in connection with the data lake 402 to stream data from a variety of industrial data sources 404, including but not limited to industrial robots, motor drives (e.g., variable frequency drives or other types of drives), industrial controllers, or industrial machines or their associated control devices. As will be described in more detail herein, the data streaming services implemented by system 202 can perform user-defined analytics on individual data streams, where the analytics applied to a data stream depends in part on the source of the data contained in the stream. Analysis can be carried out on the data lake using distributed processing techniques made possible by the scalable computing resources of the data lake. In some embodiments, after stream analysis has been performed on the data streams, the data and any analytical results can be either stored on cloud-based storage in customer-specific data storage, or can be placed in defined data queues for queue analysis. A number of different types of applications 406 can leverage the data and analysis results generated and stored on the cloud platform, including but not limited to reporting applications, interactive web and mobile applications, enterprise applications, etc.

Figure 5:
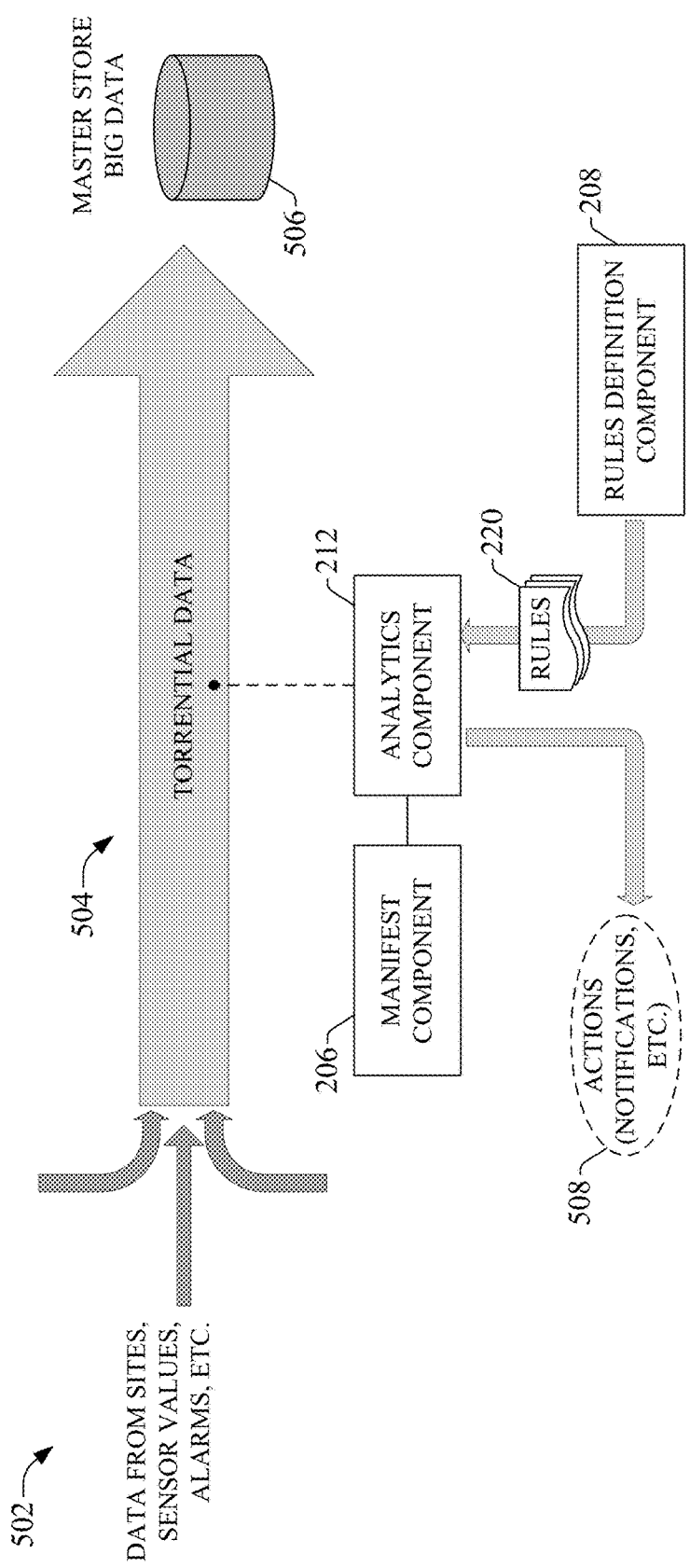
FIG. 5 is a diagram illustrating application of rules against a data stream.

As noted above, the system described herein performs stream-level analysis on the industrial data streams that migrate data from the industrial sites to the cloud system. FIG. 5 is a diagram illustrating application of rules against a data stream. In this example, the data streaming components 204 of the data pipeline and analytics system 202 (e.g., one or more produce clients and consume clients) migrate data generated by one or more data sources at an industrial facility (i.e., a customer site) to cloud-based big data storage by streaming the data from the data sources to the cloud as torrential data, yielding a data stream 504. The streamed data can include, for example, time-series data generated by sensors on the plant floor (e.g., temperature sensors, flow meters, pressure sensors, level sensors, proximity switches, etc.); alarm data generated by an industrial controller, a motor drive, a safety controller, a quality check system, etc.; or other types of data.

Figure 6:
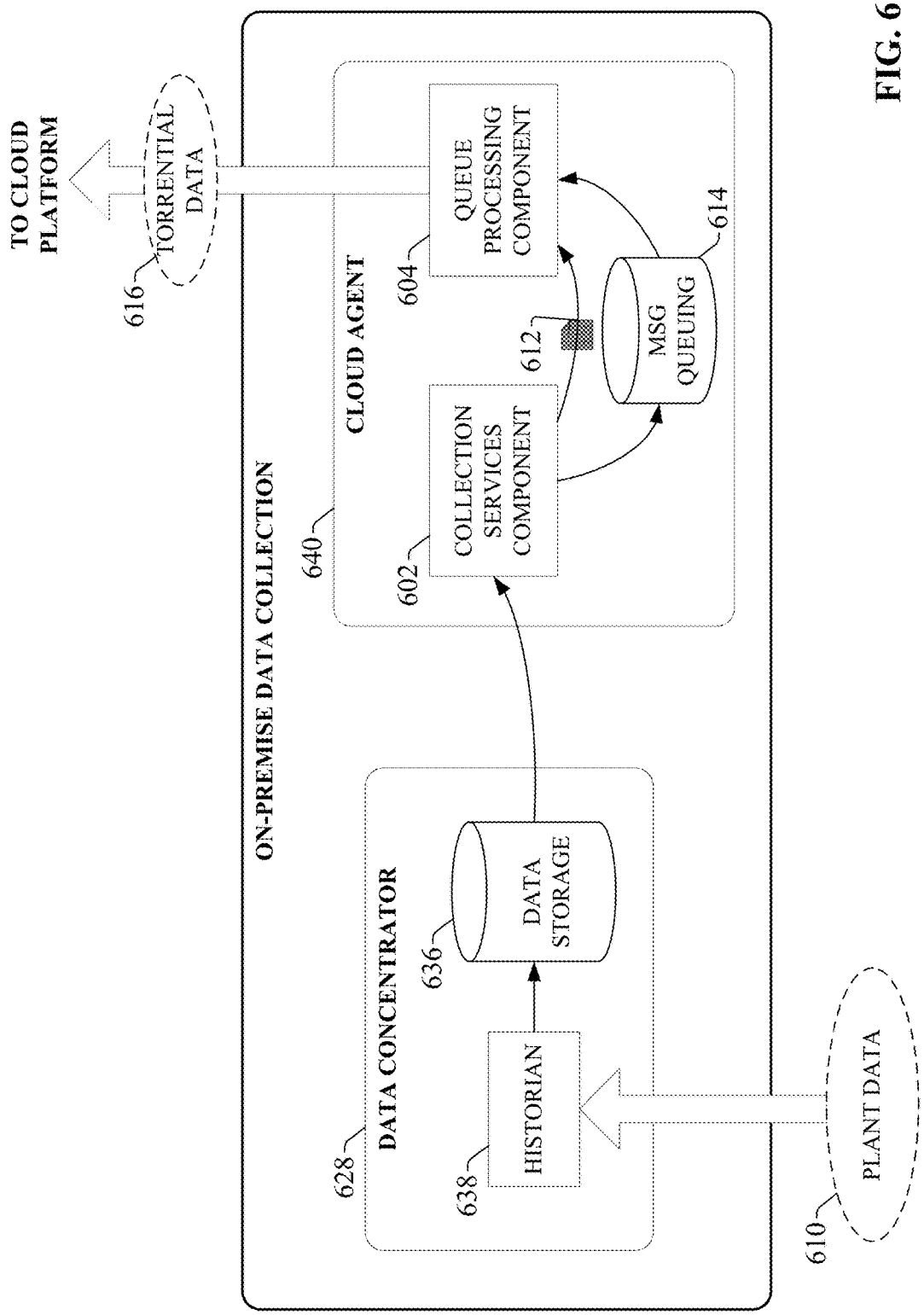
FIG. 6 is a diagram of an example cloud agent device that can reside at the plant facility and provide data to a cloud-based system.

In some embodiments, the data stream 504 can comprise data collected from the respective industrial devices at the plant facility by a dedicated on-premise cloud agent device, which interfaces with the data pipeline and analytics system 202 to facilitate streaming of torrential data to the cloud-base system. Turning briefly to FIG. 6, an example cloud agent device 640 that can reside at the plant facility and provide data to the cloud-based system 202 is illustrated. In this example technique, on-premise data collection is enabled by a collection of services that function to process and send collected industrial data to the cloud-based data pipeline. Data concentrator 628 and cloud agent device 640 respectively implement two main functions associated with data collection—data concentration using a historian 638 and associated data storage 636 (e.g., an SQL server or other type of storage), and cloud data enablement using cloud agent services executed by cloud agent device 640. Plant data 610 from one or more industrial devices is collected by data concentrator 628 at the plant facility. In an example scenario, plant data 610 may comprise stamping press time-series sensor data, made up of thousands of data points updated at a rate of less than a second. Plant data 610 can also comprise alarm data generated by one or more industrial devices in response to detected alarm events.

Collection services component 602 of cloud agent device 640 implements collection services that collect device data, either from data concentrator's associated data storage (e.g., via an SQL query) or directly from the devices themselves via a common industrial protocol (CIP) link or other suitable communication protocol. For example, to obtain data from data concentrator 628, collection services component 602 may periodically run a data extraction query (e.g., an SQL query) to extract data from data storage 636 associated with data concentrator 628. Collection services component 602 can then compress the data and store the data in a compressed data file 612. Queue processing services executed by queue processing component 604 can then read the compressed data file 612 and reference a message queuing database 614, which maintains and manages customer-specific data collection configuration information, as well as information relating to the customer's subscription to the cloud platform and associated cloud services. Based on configuration information in the message queuing database 614, queue processing component 604 packages the compressed data file 612 into a data packet and pushes the data packet to the data pipeline and analytics system 202 on the cloud platform. In conjunction with the data streaming components 204 of system 202, the cloud agent device 640 can inject the data as torrential data 616.

Message queuing database 614 can include site-specific information identifying the data items to be collected (e.g., data tag identifiers), user-defined processing priorities for the data tags, firewall settings that allow cloud agent device 640 to communicate with the cloud platform through a plant firewall, and other such configuration information. Configuration information in message queuing database 614 can instruct cloud agent device 640 how to communicate with the identified data tags and with the remote data collection services on the cloud platform.

In addition to collection and migration of data, one or more embodiments of cloud agent device 640 can also perform local analytics on the data prior to moving the data to the cloud platform. This can comprise substantially any type of pre-processing or data refinement that may facilitate efficient transfer of the data to the cloud, prepare the data for enhanced analysis in the cloud, reduce the amount of cloud storage required to store the data, or other such benefits. For example, cloud agent device 640 may be configured to compress the collected data using any suitable data compression algorithm prior to migrating the data to the cloud platform. This can include detection and deletion of redundant data bits, truncation of precision bits, or other suitable compression operations. In another example, cloud agent device 640 may be configured to aggregate data by combining related data from multiple sources. For example, data from multiple sensors measuring related aspects of an automation system can be identified and aggregated into a single cloud upload packet by cloud agent device 640. Cloud agent device 640 may also encrypt sensitive data prior to upload to the cloud. In yet another example, cloud agent device 640 may filter the data according to any specified filtering criterion (e.g., filtering criteria defined in a filtering profile stored on the cloud agent). For example, defined filtering criteria may specify that pressure values exceeding a defined setpoint are to be filtered out prior to uploading the pressure values to the cloud.

Cloud agent device 640 may also associate metadata with selected subsets of the data prior to migration to the cloud, thereby contextualizing the data within the industrial environment. For example, cloud agent device 640 can tag selected subsets of the data with a time indicator specifying a time at which the data was generated, a quality indicator, a production area indicator specifying a production area within the industrial enterprise from which the data was collected, a machine or process state indicator specifying a state of a machine or process at the time the data was generated, a personnel identifier specifying an employee on duty at the time the data was generated, or other such contextual metadata. In some embodiments, the cloud agent device 640 can also aggregate the data with external data retrieved from external sources (e.g., weather data, stock market price data, etc.) In this way, cloud agent device 640 can perform layered processing of the collected data to generate meta-level knowledge that can subsequently be leveraged by cloud-based analysis tools to facilitate enhanced analysis of the data in view of a larger plant context.

To ensure secure outbound traffic to the cloud, one or more embodiments of cloud agent device 640 can support HTTPS/SSL, certificate authority enabled transmission, and/or unique identity using MAC addresses. Cloud agent device 640 can also support store-and-forward capability to ensure data is not lost if the agent becomes disconnected from the cloud.

Returning now to FIG. 5, the data stream 504 can be customer-specific, and may include data from multiple different devices, machines, and/or facilities. As the data is being streamed from the plant facility to cloud-based storage, analytics component 212 can process selected subsets of the data based on one or more defined rules 220. Users of the system 202 can define rules 220 using rules definition component 208, which can serve one or more rule configuration screens (described in more detail below) to authorized client devices to facilitate creation of rules and association of those rules to specified data streams. Users can author rules 220 based on their knowledge of the industrial systems from which the respective data streams are received. For example, a maintenance expert responsible for a particular machine for which data is being streamed may define a rule that causes a notification event or other action 508 to be issued if a particular event relating to the machine occurs (e.g., if a winder current increases past a specified setpoint value for a defined duration of time). The analytics component 212 runs continuously or substantially continuously to apply the knowledge rules 220 to the torrential data contained in the data stream 504, regardless of the source of the data.

The manifest component 206 can be used to define which rules 220 are to be applied to each data stream 504. In general, a manifest defines a mapping between a source of data (e.g., a customer, facility, and/or machine associated with a particular data stream) and a procedure to be performed on that data, where the procedure is represented by a selected subset of the defined rules 220. For example, a manifest can comprise metadata stored on cloud storage in association with a particular data stream (which is itself associated with a particular source of data), where the manifest can identify one or more predefined or generic rules to be applied to that data stream. The manifest can also identify the particular items of streaming data that are to be used as the parameters or variable inputs for the rules, and any upper or lower limits to be enforced on the variables or on the rule outputs. In this manner, the manifest allows predefined or generic rules to be applied in an ad hoc manner for each customer whose data is being collected and monitored. Manifest component 206 can facilitate creation and management of customer-specific manifests; e.g., by implementing a manifest generation tool that allows a user to associated rule with the respective data streams.

The data contained in data stream 504 can be classified into distinct types of information. Example data types include time-series sensor data and alarm data (alarm data can also be classified together with fault and event data). Alarms, faults, and events can be generated by a number of different on-premise data sources, including but not limited to industrial controllers and drives, dedicated alarm monitoring systems (e.g., low and medium voltage drives monitoring systems), surveillance systems with dedicated virtual private networks (see FIG. 3) or other such sources. For data falling under this category, users may wish to distinguish between events, alarms, and faults. Events may be defined as normal operational statuses of different devices that are part of one or more industrial systems (e.g., a start button has been pressed, a proximity switch has been activated, a valve has been closed, etc.). Alarms can be defined as detected statuses that indicate potential problems. For example, if a monitored motor current exceeds a defined setpoint, the motor may continue to run, but may eventually result in a motor fault if the current level is not reduced. Alarms can preemptively warn operators or maintenance personnel that a preventative action may be necessary to prevent a system failure or downtime occurrence. Faults can be defined as a failure or downtime condition detected within the system (e.g., an encoder value has been lost, a fuse has been blown, an emergency stop condition has occurred, etc.).

Time-series sensor data may originate from industrial controllers, drives, telemetry devices, or other such industrial devices. This data can include data point information (e.g., temperatures, pressures, etc.) that reflects process information relating to an industrial process being monitored and/or controlled by the industrial devices. Time-series sensor data can be useful for remote proactive or predictive analysis of the industrial process.

The pipeline and analytics system 202 can ingest both of these types of data (as well as other data types in some embodiments) into the data stream 504 and apply analytical rules to selected subsets of the data in accordance with metadata defined by the manifests, before storing the data (as well as any additional analytical result data generated by applying the rules) in cloud-based storage 506.

Figure 7:
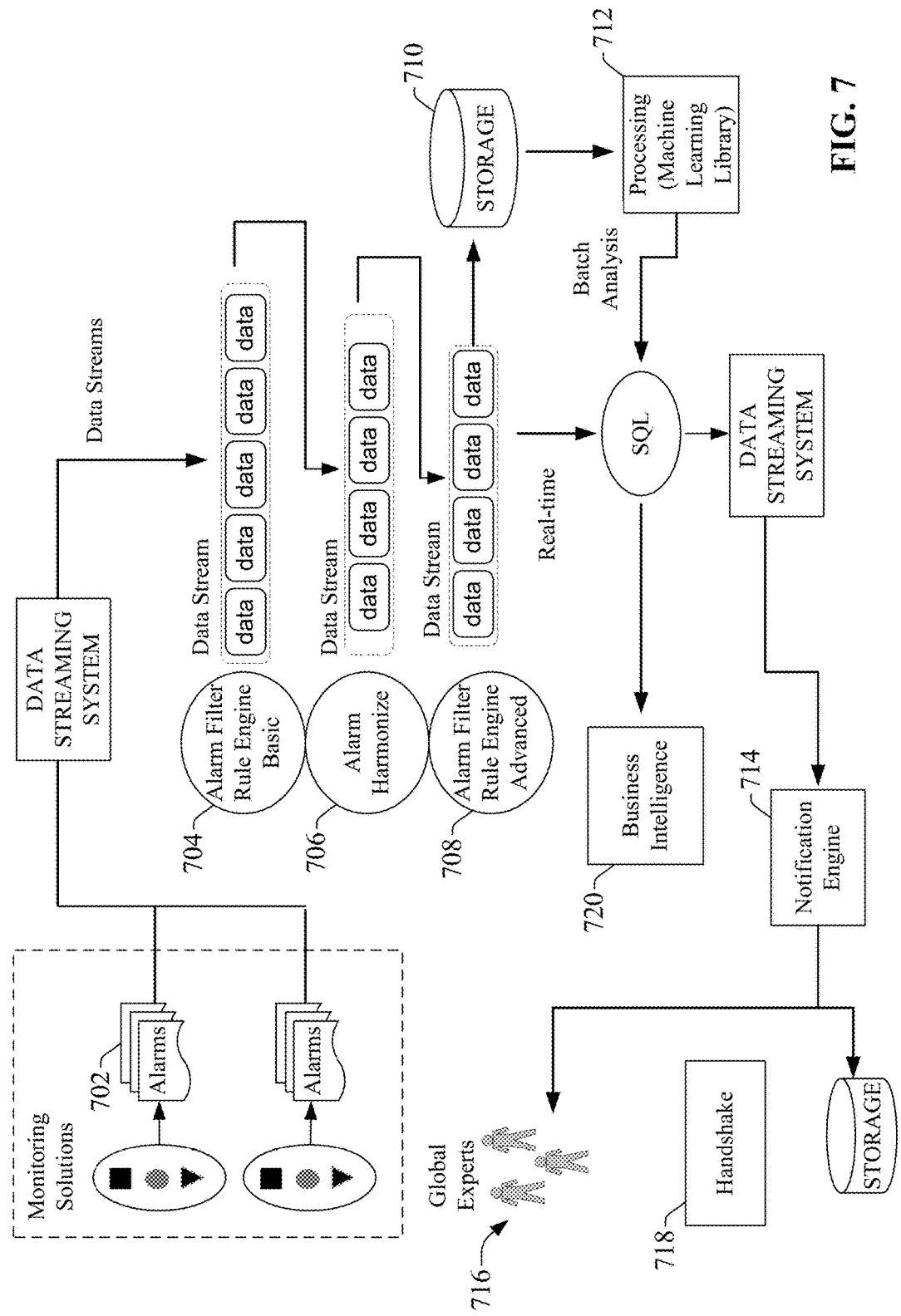
FIG. 7 is a diagram of a simplified architecture of a cloud-based system uses a data pipeline and analytics system in connection with performing alarm brokering and other cloud services.

FIG. 7 is a diagram of a simplified architecture of a cloud-based system uses data pipeline and analytics system 202 in connection with performing alarm brokering and other cloud services. In this example, the cloud-based system receives alarm and time-series sensor data (TSSD) 702 from multiple industrial facilities associated with different industrial enterprises or customers (e.g., from cloud agent devices or other monitoring systems. Data streaming components 204 of the pipeline and analytics system 202 migrates this diverse data to the cloud system as torrential data within segregated data streams, where the data contained each data stream corresponds to a particular customer, facility, and/or machine. The system can apply any defined filtering rules to the streaming alarm data at 704.

Before the data is moved to the alarm brokering system, the alarm and event data is harmonized at 706 (e.g., by harmonization component 210) to a common schema by adding a harmonization envelope to respective items of alarm data. Harmonization of the alarm data can bridge the data lake to the alarm brokering functionality. To this end, the harmonization component 210 can gather alarms from different sources into batches, apply alarm harmonization to the batch of alarms, and transfer the harmonized data to the alarm brokering system via a subscription channel into a brokering level entry queue. The entry queue will provide acknowledgements back to the harmonization component 210 (e.g., success, failure not available, etc.). The harmonization component 210 can use the acknowledgements from the brokering system to manage the alarm batch status. The alarm batches will be indexed in such a way that an organized batch table structure can be established.

Alarm harmonization creates a common schema around the alarm data by adding a harmonization envelop to the original alarm structure while keeping the original format of the alarms. Turning briefly to FIG. 8, an example harmonization envelop is illustrated. The common schema afforded by the harmonization process allows rules—such as business intelligence rules or other types of rules—to be organized around the data to process the alarms in an efficient and consistent manner subsequently, alarms moved from the on-premise data sources to the data lake corresponding to raw-level alarms.

Each raw-level alarm can contain information that assist in identifying the locale of origin, alarm description, and time stamp representing the time that the alarm was generated. To create an alarm batch, each raw-level alarm is harmonized according to the schema shown in FIG. 8. To create an alarm batch, the harmonization component can harmonize each raw-level alarm by adding fields for the Time Zone, Technology, Status, Mode, and Filter Key to each alarm record. The Time Zone field identifies a time zone of origin for the alarm. The Technology field identifies a particular technology to which the alarm relates, which can be used by the brokering services to identify a suitable set of technical experts for addressing the alarm event identified by the alarm. The Status field can identify a current processing status of the alarm—e.g., In Process, Waiting, Served, Escalated, or Completed. The Mode field indicates a mode of the alarm record—e.g., Filtered, Correlated, Base, Managed, or Master. The filter key can identify a field (e.g. the Application ID or Technology fields) to be used as a filter key. The Rework field can be used to track the number of attempts made by the brokering system to process the alarm. It is to be appreciated that the harmonization schema illustrated in FIG. 8 is only intended to be exemplary, and that any suitable schema can be used to harmonize the alarm data records without deviating from the scope of this disclosure. The harmonization process prepares the alarm information for the alarm brokering functionality carried out by the cloud-based brokering system.

Returning now to FIG. 7, additional alarm filtering may be performed on the harmonize alarms at 708 (advanced alarm filter rules engine). Then, each harmonized alarm is accumulated in a transferring batch prior to transmission to the brokering system. The size and the batch and its transmission rate are set by configuration settings that can be controlled by a system manager during the system configuration phase (e.g., via a system user interface). A given alarm batch can contain a mix of alarms that emerge from various industrial systems that are being monitored on a per customer basis. The cloud-based system maintains customer data sovereignty throughout the alarm processing. The resulting alarm batches are then stored on cloud-based storage 710 for batch analysis by broker processing functionality 712. A notification engine 714 can notify one or more experts 716 (selected based on the alarm brokering process) if results of the alarm processing indicate an event that merits attention by technical support personnel. In such scenarios, the notification engine 714 can generate information relating to the detected alarm event and store this information in cloud storage 718 accessible to the notified experts. Results of the processing can also be leveraged by other applications, such as business intelligence applications 720.

As will be described in more detail below, the alarm filtering, harmonization, and other rule-based analytics are carried on respective data streams as the customer-specific data is being migrated to the data lake from the various industrial facilities and industrial enterprises.

Figure 9:
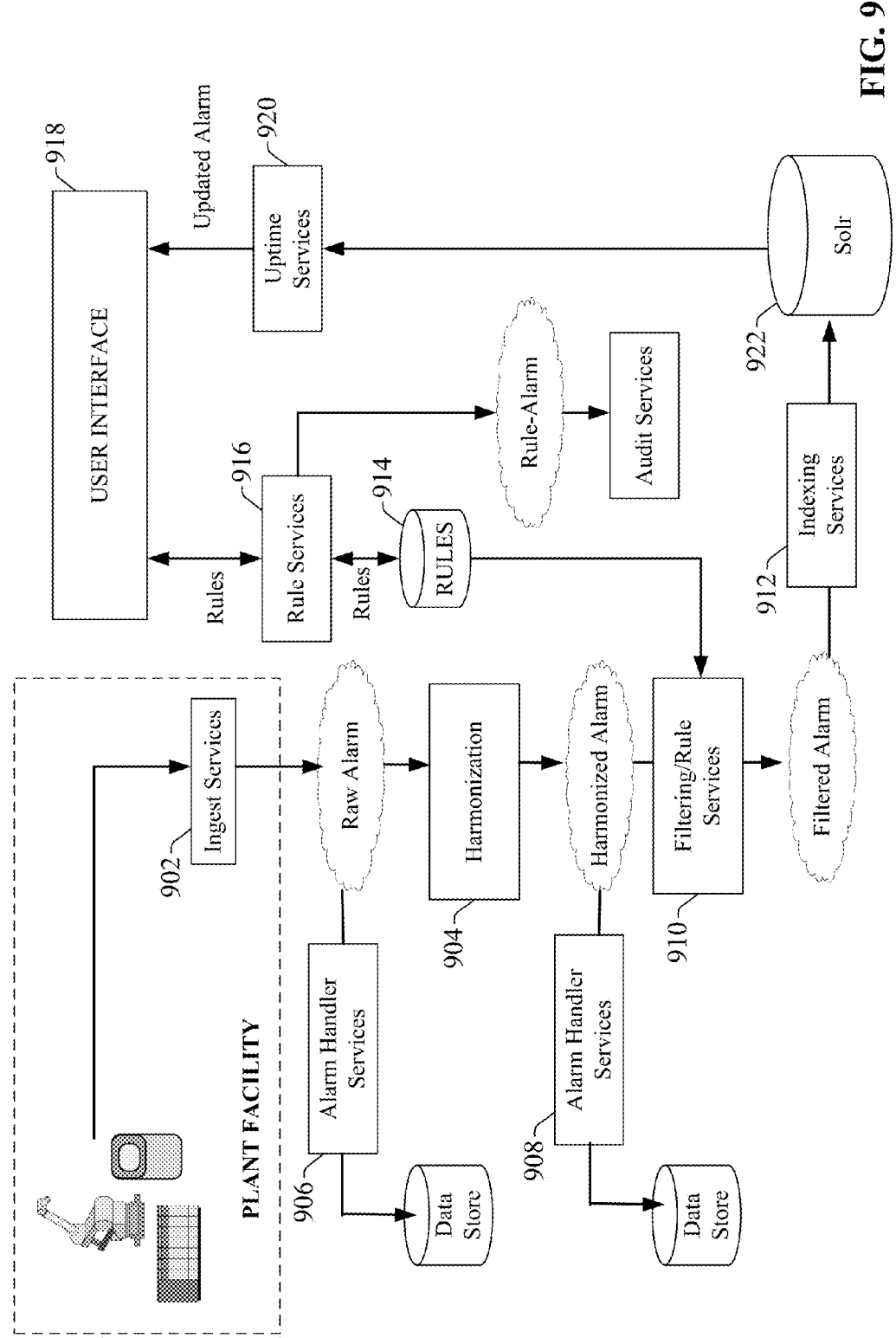
FIG. 9 is a diagram of another view of the data streaming and analytics system.

FIG. 9 is a diagram that provides another view of the data streaming and analytics system. As described above, data ingestion services 902 (e.g., implemented by cloud agent devices) collect time-series sensor data and/or alarm data from industrial devices at a plant facility and stream the collected data to the data lake on the cloud platform as torrential data. In the case of alarm data, the data is received at the cloud platform as raw alarm data, which is then harmonized as described above by harmonization processes 904 (in some configuration, the cloud-based system may include alarm handler services that perform some initial alarm processing or handling on the raw alarm data prior to harmonization). The harmonized alarm data can be processed by alarm handling services 908, and/or filtered and processed by filtering/rule services 910 (e.g., implemented by analytics component 212). The filtered and processed alarms can then be indexed in cloud storage 922 on the data lake by indexing services 912.

The rules applied by the filtering/rule services 910 can be stored in data storage 914, segregated according to data stream. That is, each data stream corresponds to a particular industrial enterprise, industrial facility, and/or industrial system or process, and a set of rules are defined for each data stream and stored in data storage 914. In this way, customer-specific analytics are performed on each data stream, where the analytics rules applied to each stream are partly a function of where the data originates. Rules services 916 (e.g., implemented by the rules definition component 208) allow users to define and store rules to be applied to the data streams via rule definition interface displays rendered by the user interface 918 associated with the cloud system (e.g., implemented by user interface component 214). Example rule definition interface displays and work flows will be described in more detail below. Uptime services 920—including alarm brokering services, notification services, reporting services, etc.—can send updated alarms or other information relating to the indexed data to authorized users via the user interface 918.

Figure 10A:
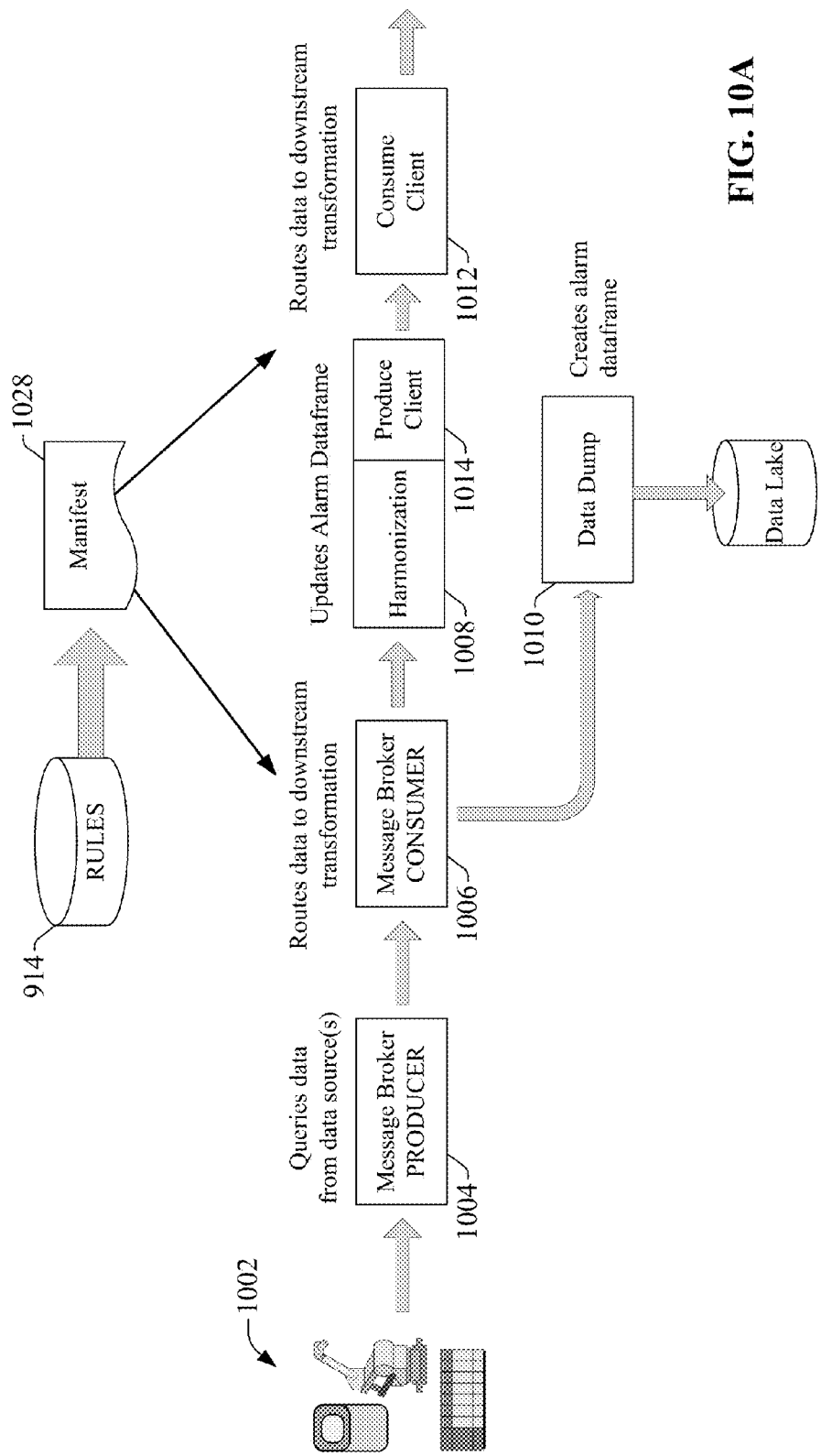
FIGS. 10A and 10B are diagrams illustrating an example data pipeline that streams data from an industrial site to a cloud-based analytics system.
Figure 10B:
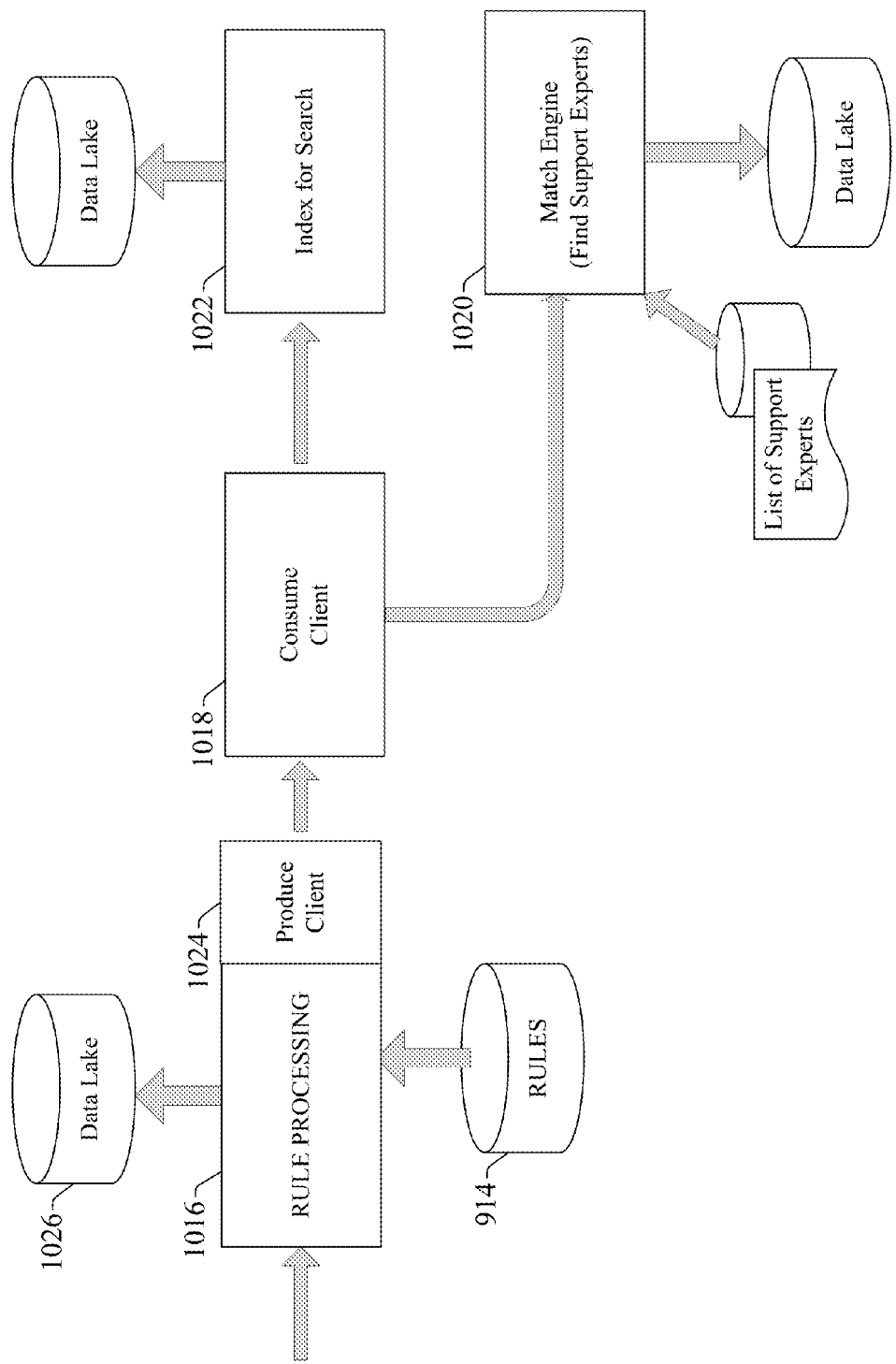

The term data pipeline is used to represent the workflow of data from the plant facility to the data lake (e.g., the data lake associated with cloud storage 922) and the processing stages that take place during this migration. This data pipeline is described in more detail with reference to the function blocks depicted in FIGS. 10A and 10B. In this example implementation, streaming of data from the industrial data sources 1002 at the plant facility is implemented by an event produce client 1004 on the plant floor and an event consume client 1006 that executes on the cloud platform. The event produce client 1004 (which may be implemented by a cloud agent device, such as cloud agent device 640) queries local data sources for data at regular intervals, and publishes the data for retrieval by the event consume client 1006. This produce/consume configuration yields an event driven architecture that isolates respective data processing steps that takes place in the pipeline. This configuration also renders the pipeline scalable, since new event produce clients 1004 can be added that provide data to the same event consume client 1006, and new data stream processing workflows can be added to the pipeline after the data consume client 1006.

The consume client 1006 routes the raw industrial data from the produce client 1004 to downstream transformation and analytic processing, including the harmonization processing block 1008 (implemented by harmonization component 210). Also, to facilitate internal tracking and record-keeping, raw (pre-harmonized) data and results of any associated processing (e.g., processing carried out by alarm handler services 906) is stored on distributed cloud storage by a data store stages 1010.

The raw data is harmonized at the harmonization processing block 1008 as described above, and the harmonized alarm data is saved. The harmonized data is routed by another produce/consume client pair (comprising produce client 1014 and consume client 1012) to further other downstream transformation and analysis processes, illustrated in FIG. 10B. The rule processing block 1016 applies user-defined alarm rules to the harmonized alarm (or TSSD) data, including but not limited to alarm inhibiting rules, masking and filtering rules, and monitoring rules.

Alarm inhibit rules can be designed to inhibit alarms at the individual alarm level, as well as at the device or process level, as defined by the manifest 1028 (to be described in more detail below). Such inhibit rules may be created, for example, by support experts or end users in order to control or reduce the effective workload generated by alarm data. For example, inhibit rules applied to data streams by processing block 1016 (implemented by analytics component 212) may define that certain types of alarms, or alarms from specified devices, processes, or industrial systems, are not to generate an alarm notification or initiate an alarm brokering procedure. Some alarm inhibit rules may also define criteria for correlating groups of alarms or other data with one another. Such correlation rules may define that alarms that were generated as a result of a common alarm event should be correlated. The alarm brokering system can subsequently use this correlation information to send a single alarm for this correlated group of alarms, thereby reducing the number of notifications generated by the event.

Filtering rules can define filtering criteria to be applied to the data streams. An example filtering rule may instruct that, for a specified data item representing a telemetry value, data values greater than 10 should be discarded.

Monitoring rules can encompass a wide range of analytics to be performed on the data streams. In general, monitoring rules can be used to capture expert knowledge about a monitored process associated with a given data stream. Such rules can be designed, for example, to perform analytics on selected items of time-series sensor data contained within the data stream over time, and to carry out actions based on results of the analysis. Such actions may include sending notifications to selected personnel in response to determining that one or more items of time-series sensor data satisfies a condition, changing a process control setpoint or parameter for the monitored industrial process in response to a detected condition of the time-series sensor data, or other such actions.

Processed data generated by the rule processing is stored in data storage 1026. For tracking and record-keeping purposes, this can include any alarm values that were filtered or inhibited by the rules, analysis results, actions that were taken as a result of a rule-based analysis, or other such information.

Another produce/consume client pair (comprising produce client 1014 and consume client 1018) routes the processed data from processing step 1016 to downstream processes associated with the data pipeline. This can include sending the data to an index processing block 1022, which stores the processed data in cloud storage 2026, making the data available for subsequent searches. Consume client 1018 also sends the processed data to a match engine 1020 of the brokering system for alarm broker processing. This processing can include identifying alarms that require technical support attention, and matching these alarms to suitable experts (as described above in connection with FIG. 3). Alarm brokering (as described above in connection with FIG. 3) will be performed after the alarm data from the pipeline has been harmonized, inhibited, and filtered, and any defined monitoring rules associated with the pipeline have been applied. Definition of monitoring rules will be described in more detail below.

As noted above, the use of produce/consume clients to convey data through the data pipeline allows isolation between processing steps performed on the data streams. This allows selected processing blocks to be modified without disrupting other processing blocks that make up the pipeline. For example, the harmonization processing block 1008 or the rule processing block 1016 can be modified or upgraded to newer versions without the need to disable or disrupt other processing blocks. To further isolate the data processing from version control, the system leverages a manifest 1028, which allows processing of data streams to be segregated based on the source of the data contained in the streams. In general, each data stream—which is associated with a particular industrial enterprise, facility, production area, or automation system—is assigned a manifest that maps the source of the data to a particular set of rules or procedures to be applied to the data stream. In particular, the manifest identifies which procedures, of a set of predefined or generic procedures stored in rules storage 914—are to be invoked and applied to the data at respective stages of the data pipeline as the torrential data is streamed to the data lake. As a data stream is being moved through the data pipeline, the analytics component 212 invokes and references the manifest 1028 associated with that data stream in order to determine which stored rules or procedures in storage 914 are to be applied to the data stream. The manifest 1028 contains information that identifies the subset of stored rules to be applied to the stream, as well as information identifying which particular data items contained in the stream are to be mapped to the respective variables or parameters defined by the rules.

Figure 11:
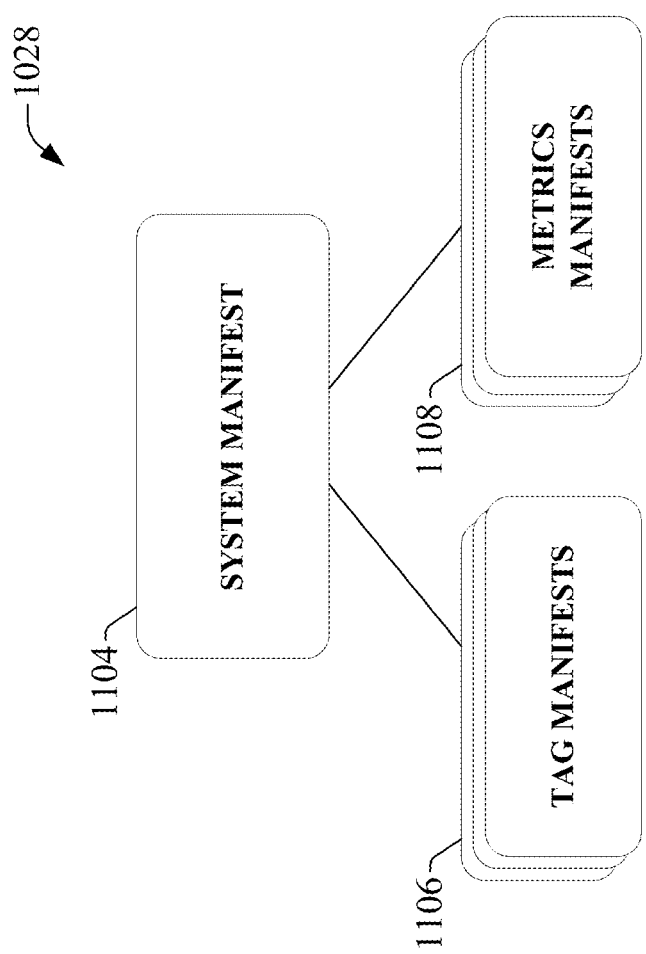
FIG. 11 is a conceptual diagram of an example manifest comprising a system manifest, one or more tag manifests, and one or more metrics manifests.

An example manifest 1028 associated with a given data stream conveyed by the data pipeline can include a system manifest associated with the particular data stream or data source, as well as associated customer-specific tag manifests and metric manifests. FIG. 11 is a conceptual diagram of an example manifest 1028 comprising a system manifest 1104, one or more tag manifests 1106, and one or more metrics manifests 1108. A system manifest 1104 can correspond to a particular data stream being conveyed by the pipeline, and can include links to customer-specific and application-specific tag manifests 1106 and metrics manifests 1108 that define actions that can be performed on some or all of the data contained in that data stream. As data from a particular customer-specific data source (e.g., an industrial automation system, machine, device, or collection of industrial assets) is being streamed from the industrial site to the cloud-based data lake, the analytics component 212 of the data pipeline and analytics system 202 invokes the appropriate manifest (system manifest 1104, tag manifest 1106, and metrics manifest 1108) for processing selected items of data being conveyed in the data stream. In general, the metrics manifest 1108 identifies one or more generic or user-defined rules that can be retrieved from rules storage 914 and executed on the torrential data, as well as application-specific ranges, coefficients, and thresholds that may be passed to the retrieved procedures as parameters. The tag manifest 1106 identifies tag names or other data item identifiers used to map selected data items in the data stream to variables or tags defined in the retrieved rules.

FIG. 12 illustrates an example system manifest 1200. As shown, the system manifest 1200 conforms to a hierarchical structure wherein levels of the hierarchy can be navigated based on metadata associated with the data stream (e.g., customer identifier, site, etc.). The system manifest 1200 can include links to one or more available tag manifests and metrics manifests that can be selectively invoked to process data contained in the data stream. As shown in the example system manifest 1200, a particular metrics manifest 1208 and tag manifest 1210 is associated with a customer ID 1202, site ID 1204, and virtual support engineer (VSE) ID 1206. Additional hierarchical levels for message type 1212 (e.g., alarms or historical data) and process ID 1214 are used by the analytics component 212 to identify the respective namespaces 1216 and associated rules that define how the data contained in the data stream is to be processed by the cloud-based data process services. In the example illustrated in FIG. 12, Alarm data is associated with the namespace CoreProcessAssembly.AlarmDataProcess (assembly file name CoreProcessAssembly.dll), while Historical data is associated with the namespace CoreProcessAssembly.HistoricalDataProcess. Another namespace can also be defined and associated with TSSD data or other data types.

FIG. 13 illustrates an example tag manifest 1300, which identifies the data to be operated on by the identified metrics. In this example, the data is identified using tag names 1302 that specify the particular data items within the data stream that are to be included in the rules-based processing. The tag manifest 1300 also defines one or more application IDs 1308 representing applications that can be invoked and executed on the data. The application IDs 1308 are respectively defined in terms of one or more process IDs 1304 corresponding to stored generic or user-defined rules that will be executed on the data when the corresponding application ID is invoked. In the example tag manifest illustrated in FIG. 13, application ID 1.1 (named "TurboExpander1") comprises three rules—process ID 1 ("NetPower"), process ID 2 ("CycleEfficiency"), and process ID 3 ("PowerGuarantee"). These processes—which correspond to rules defined and stored on the cloud platform in rules storage 914—will be applied to the data corresponding to the tag names 1302 when the TurboExpander1 application is invoked.

Figure 14:
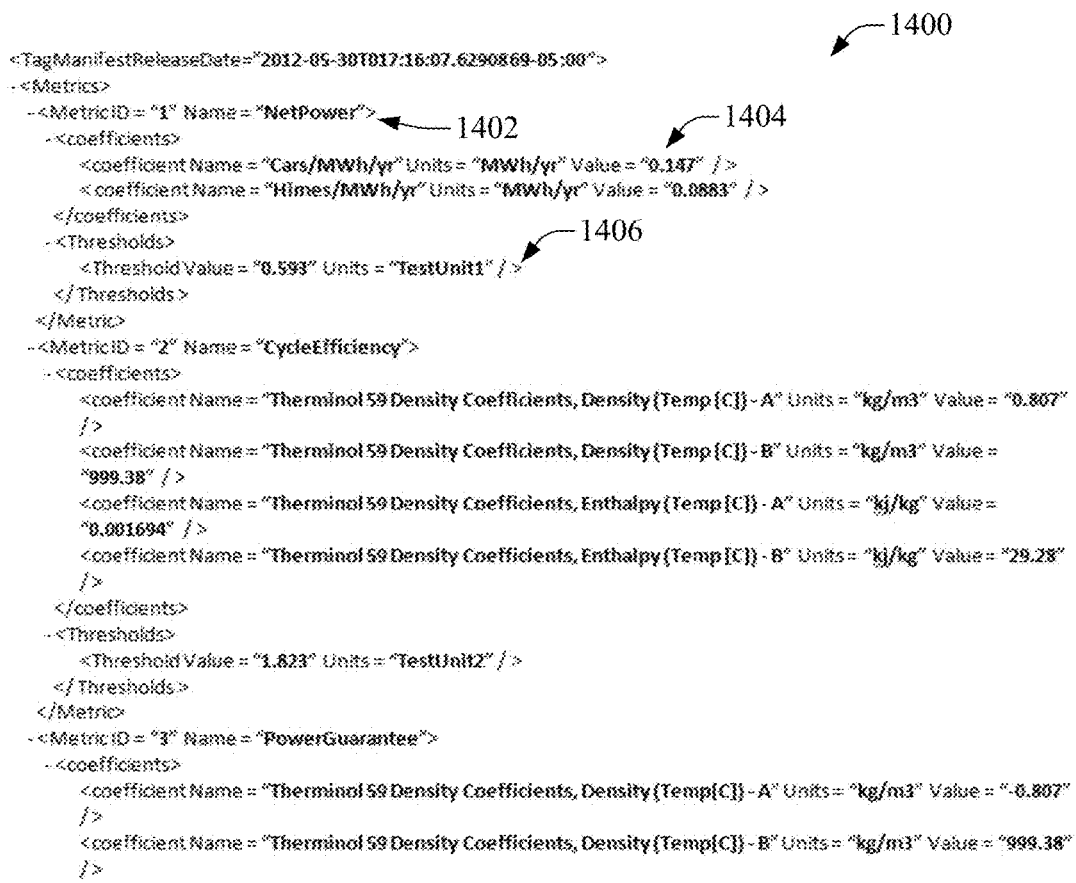
FIG. 14 is an example metrics manifest.

FIG. 14 illustrates an example metrics manifest 1400, which defines the coefficients, thresholds, and ranges to be used for each of the rules specified by the process IDs 1304 in the tag manifest 1300. For each metric ID 1402 (corresponding to the process IDs defined in the tag manifest 1300), a set of coefficients 1404 and thresholds 1406 are defined. For each defined coefficient, the metrics manifest 1400 defines a coefficient name, a unit, and a value. For each defined threshold, the metrics manifest 1400 defines a value and a unit.

In general, the manifest 1028 maps the source of a data stream with one or more analytic procedures or rules to be applied to the data in that stream. The rules are stored in rules storage 914 and invoked by the manifest 1028. Some of the rules defined and stored in rules storage may be generic rules that are applicable to any data stream from any site or customer, while other rules may be specifically designed for particular sites or customers and are only applicable to data streams from those sites or customers. In either case, the rules can be selected in an ad hoc manner in accordance with the definitions encoded in the manifest 1028. Generic rules can include generic parameters that define variable inputs into the analytic procedure defined by the rule, and the customer-specific manifest can define which customer-specific data items or tags within the manifest's data stream map to each of those generic parameters. These mappings may be defined, for example, in the tag manifest portion of the manifest. When a manifest invokes a generic rule for application to a particular customer's data stream, the generic rule can reference the manifest in order to identify which customer-specific data items are to be acted upon by the rule. Generic rules can be stored in rules storage 914 according to relevant industry, technology, industrial device, and/or any other suitable categorization or groups of categories.

The rules definition component 208 can generate and store the rules in accordance with rule definition input received via the user interface component 214. For example, as will be described in more detail below, the user interface component 214 can generate and serve a set of user interface screens that guide a user through the process of defining, modifying, and storing rules in rules storage 914. The rules definition component 208 also generates and tracks version control information for each rule, including but not limited to an author of the rule, a date that the rule was created or modified, a description of the rule and/or any modifications made to the rule, etc. In some embodiments, the rules definition component 208 can include security features that prevent newly defined rules from being invoked by a manifest until the rule has been approved by a designated supervisor.

Figure 15:
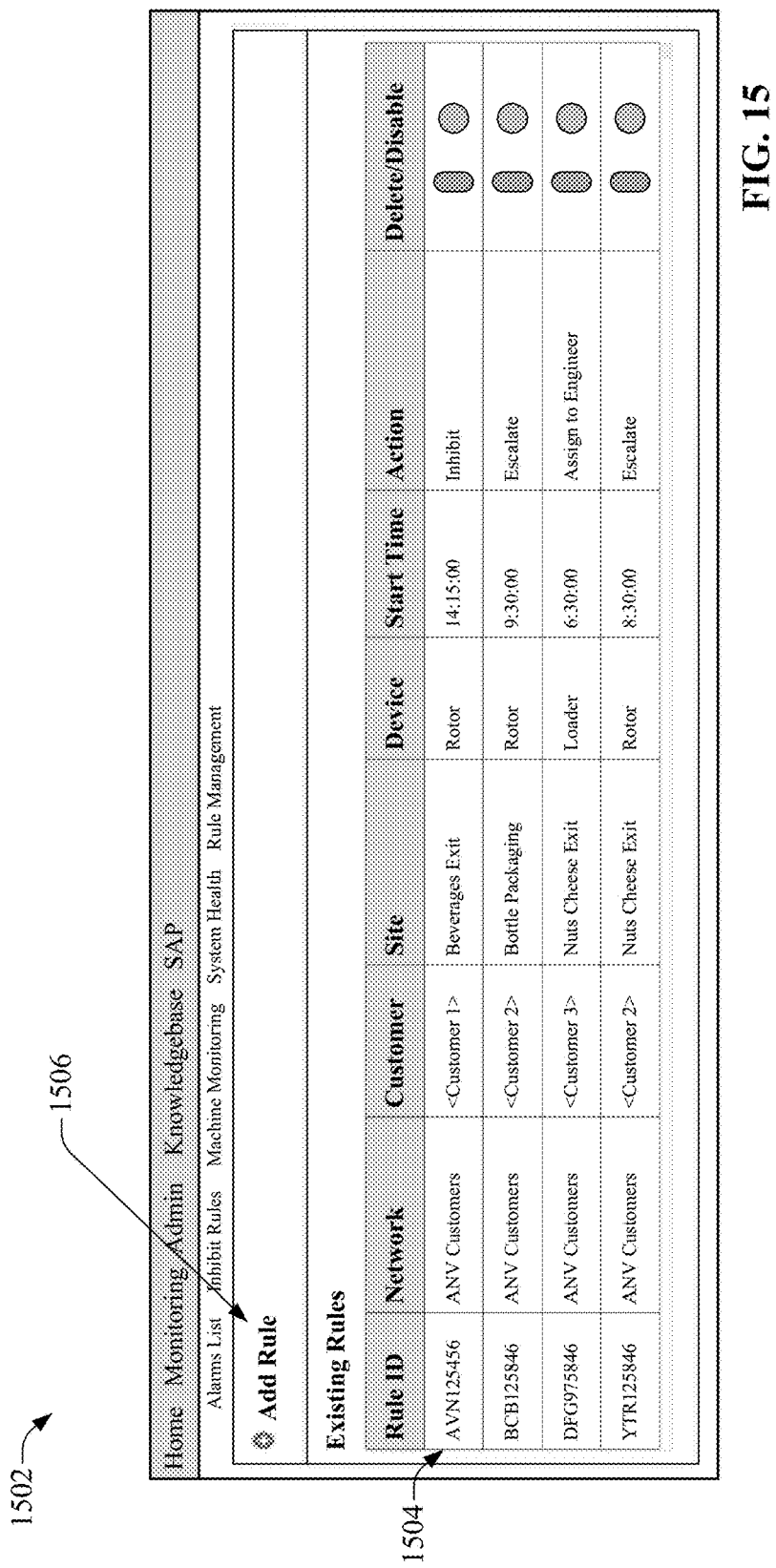
FIG. 15 is an example user interface screen used to define rules that can be invoked by a manifest for processing data streams.

FIG. 15 is an example user interface screen 1502 that can be generated by the user interface component 214 and used to define rules that can be invoked by the manifest for processing data streams. The particular example screen illustrated in FIG. 15 depicts a list of alarm rules. Each row 1504 of interface screen 1502 corresponds to a defined rule, with each rule identified by a unique Rule ID. Network, Customer, Site, and Device columns can identify, hierarchically, the customer-specific source of the data stream to which the rule is to be applied. The Network column identifies a network of customers, and the Customer column identifies the particular customer within the identified network to whom the rule is made available. The Site column identifies a plant facility belonging to the identified customer, and the device identifies a device within the facility that produces data contained in the data stream. The Action column can define an action to be performed on the alarm data in the data stream (e.g., inhibit, escalate, assign to engineer, etc.). Controls are included that allow the user to delete or disable a selected alarm rule. Rules can be sorted or filtered according to any of the column headings.

Figure 16:
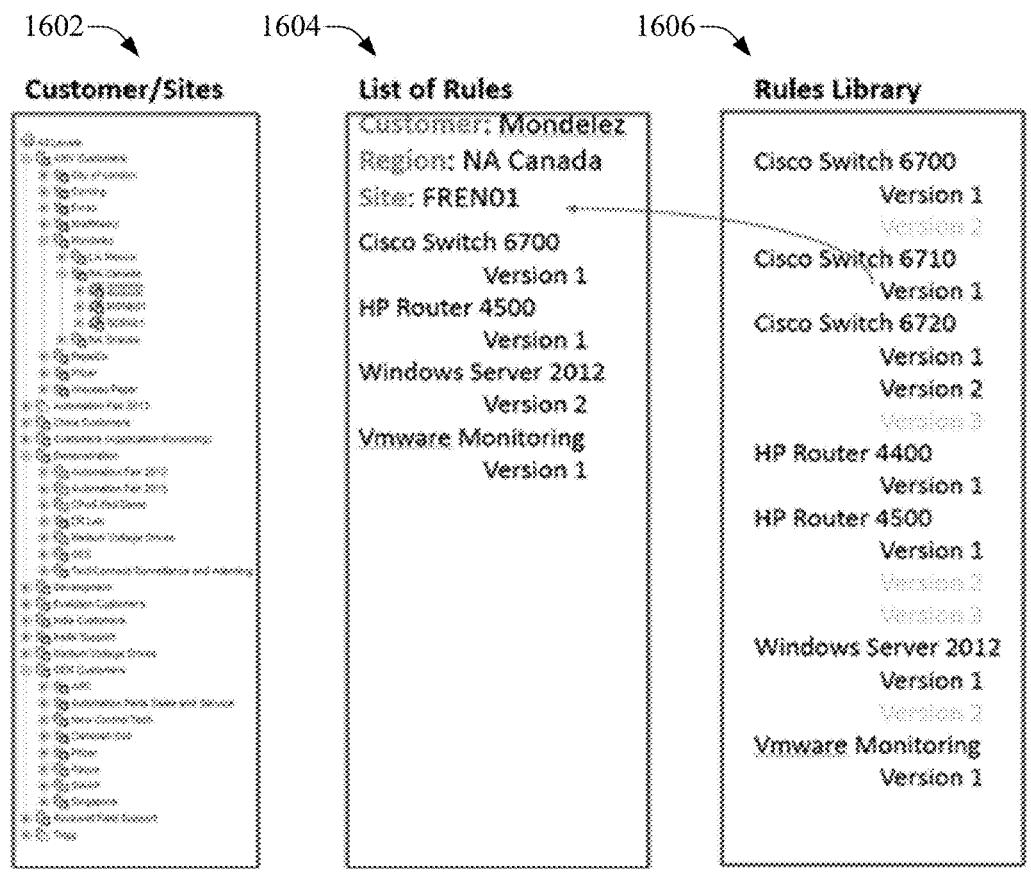
FIG. 16 is an example user interface screen that can be used to assign rules to a customer or site via drag-and-drop interaction.

Global rules can be defined and stored in rules storage 914, and selectively assigned to particular customers. FIG. 16 is an example user interface screen that can be used to assign rules to a customer or site via drag-and-drop interaction. In this example, a list of available customer sites are rendered on a Customer/Sites section 1602 of the interface. The customers and site scan be rendered as a hierarchical tree structure that organizes customer sites in accordance with suitable hierarchical levels (e.g., Customer Network level, Customer level, Region level, Site level). Selection of a customer site from the Customer/Sites section 1602 causes the list of rules assigned to that site to be rendered in a List of Rules section 1604. Rules can be assigned to the selected customer site by selecting a rule from a Rules Library section 1606—which can render a list of available rules stored in rules storage 914—and dragging the selected rule to the List of Rules section 1604. As shown in FIG. 16, multiple rules can be associated with a given customer site in an ad hoc manner. For embodiments in which rules must be approved by a supervisor before being applied to a data stream, rules that have not yet been approved can be made visible in the Rules Library section 1606 but rendered in a manner indicating that these rules are not yet available for selection (e.g., by greying the text).

Figure 17:
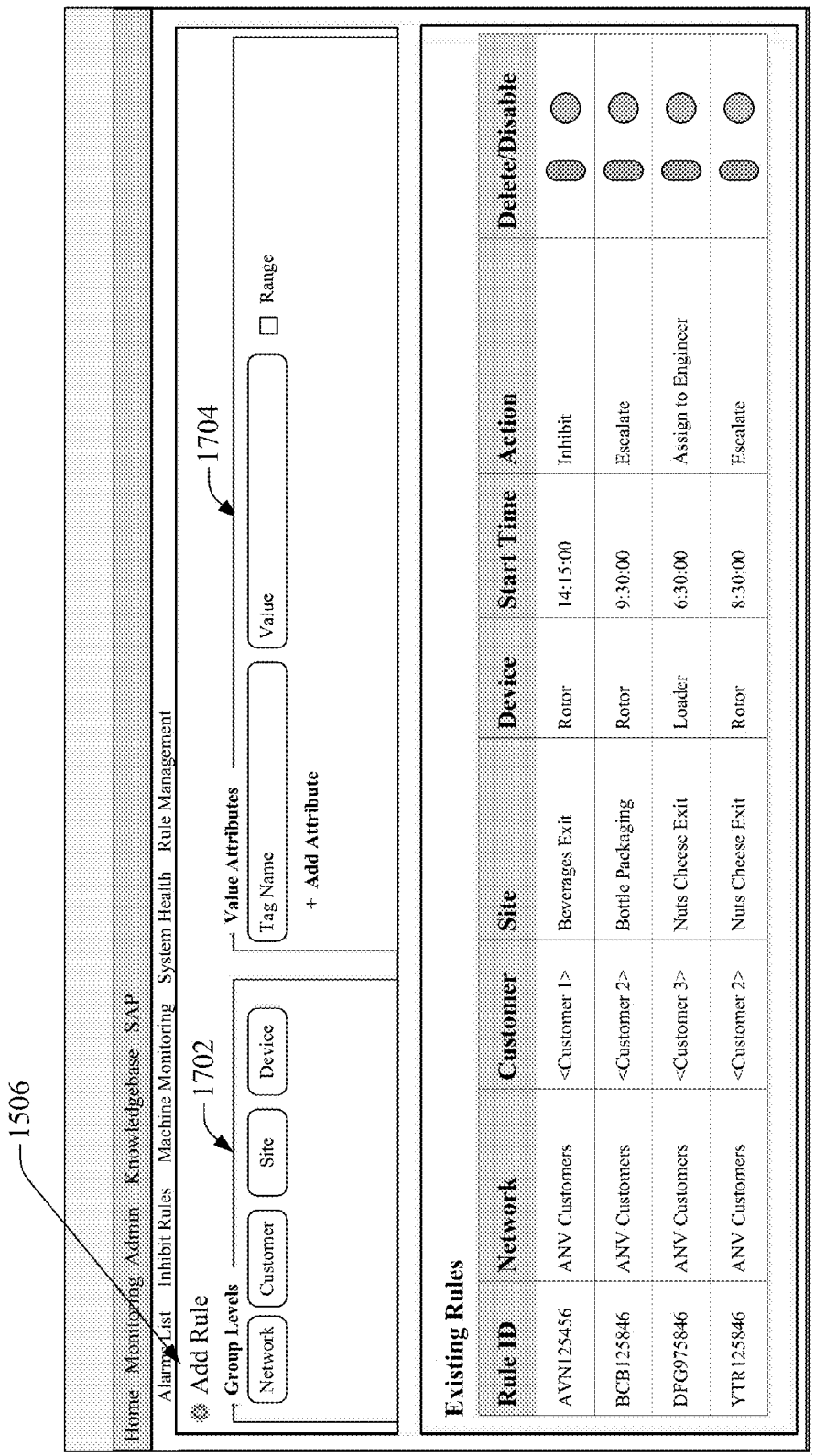
FIG. 17 is an example user interface screen that includes a section for defining analytic rules.
Figure 18:
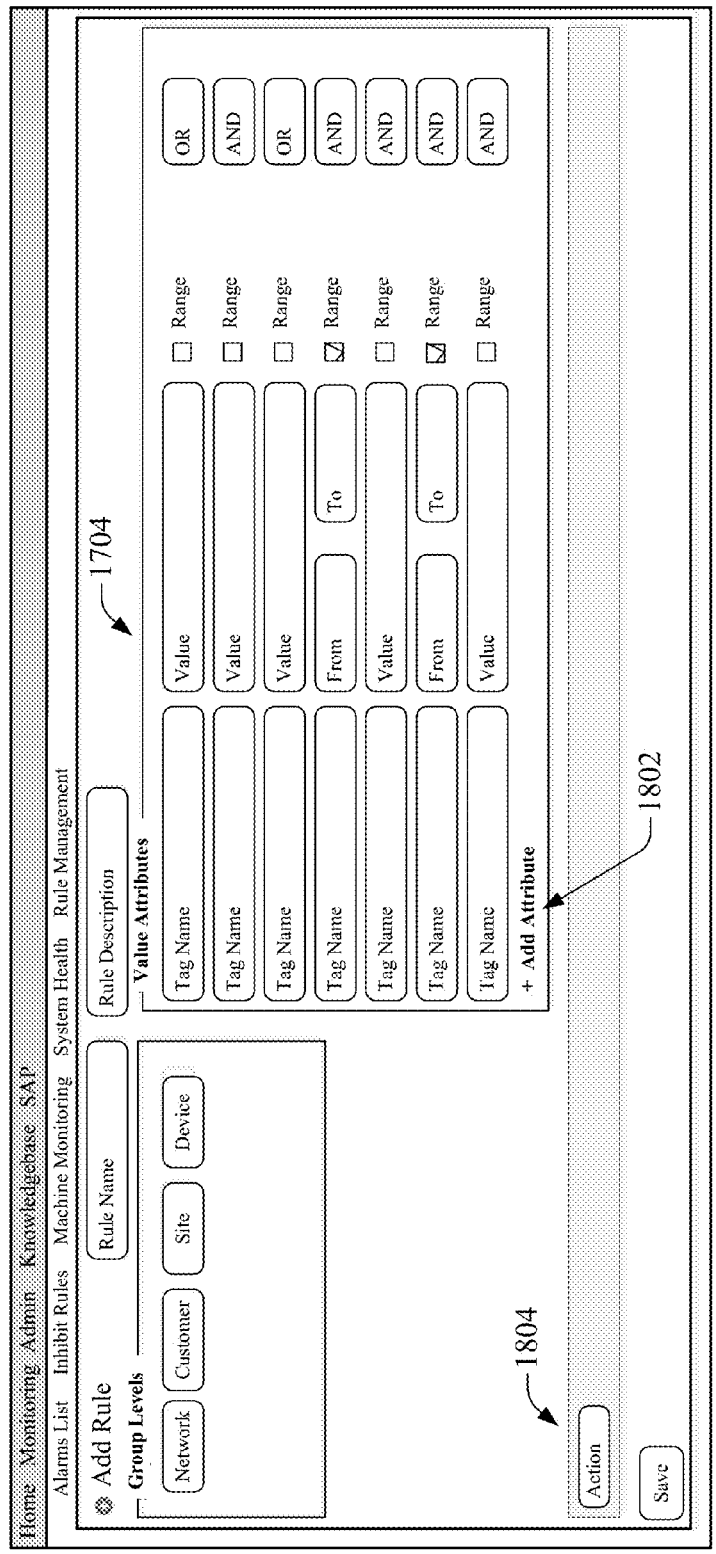
FIG. 18 is an example user interface screen that includes a section for defining analytic rules and depicts multiple value attribute fields.

Users can add new rules to rules storage 914 by selecting the Add Rule control 1506 on interface screen 1502. As shown in FIG. 17, selecting this control 1506 can cause a Rule Configuration section to be displayed, where the Rules Configuration section includes a Group Levels section 1702 and a Value Attributes section 1704. The Group Levels section 1702 includes selection controls that allow the user to select the data source—in terms of Network, Customer, Site, and Device—to which the rule will be applied, and the Value Attributes section 1704 allows the user to add data value attributes that will trigger the rule. As shown in FIG. 18, multiple value attributes can be added using the Add Attribute control 1802, and AND and/or OR operators can be used to aggregate the attributes. The Tag Name field specifies a particular data item within the data stream corresponding to the selections made in the Group Levels section 1702, and the corresponding Value field defines the condition of that data item that will cause the rule to be invoked.

Each attribute can be defined as a setpoint value or a range of values. Setpoint values will be cause the attribute to be TRUE when the corresponding tag (specified by the Tag Name field) is greater than or equal to that value, while attributes set as ranges will be TRUE when the corresponding tag has a value within the defined range of values. When aggregated by the AND and OR operators, the value attributes collectively define one or more conditions, in terms of monitored values of data items within the selected data stream, that will cause the new rule to be triggered.

With the group levels and value attributes selecting, an Action control 1804 can be selected to render a graphic that allows the user to select the action to be performed when the conditions defined by the value attributes become TRUE. FIG. 19A is an example Action Configuration display that can be used to set the action to be performed. An Action Selection control 1902 can be used to select a particular action to be carried out when the defined conditions become true. Since the present example relates to an alarm rule, the options for the Action Selection control 1902 may include, for example Inhibit, Escalate, Assign to Engineer, etc. The Inhibit option causes a Number and Days fields (1904 and 1906) to be displayed, allowing the user to select a duration for which the alarm will be inhibited (or to be inhibited indefinitely). As shown in FIG. 19B, the Escalate option can cause the cloud-based alarm brokering system to escalate the alarm to a selected engineer from a defined set of available engineers, where the engineer can be selected using field 1908.

Although the example rule configuration screens illustrate configuration of alarm monitoring rules, it is to be appreciated that similar screens can be used to create TSSD monitoring rules for time-series sensor data. Information obtained via the configuration screens described above in connection with FIGS. 15-19 can be used by the system to update the set of rules maintained in rules storage 914, and/or the manifest 1028 for the appropriate data stream. The harmonization process described above (see, e.g., FIG. 8) can create dataframes for data items in the data streams having the necessary schema that maps data attitudes to fields of the interface screens depicted in FIGS. 15-19.

Figure 20:
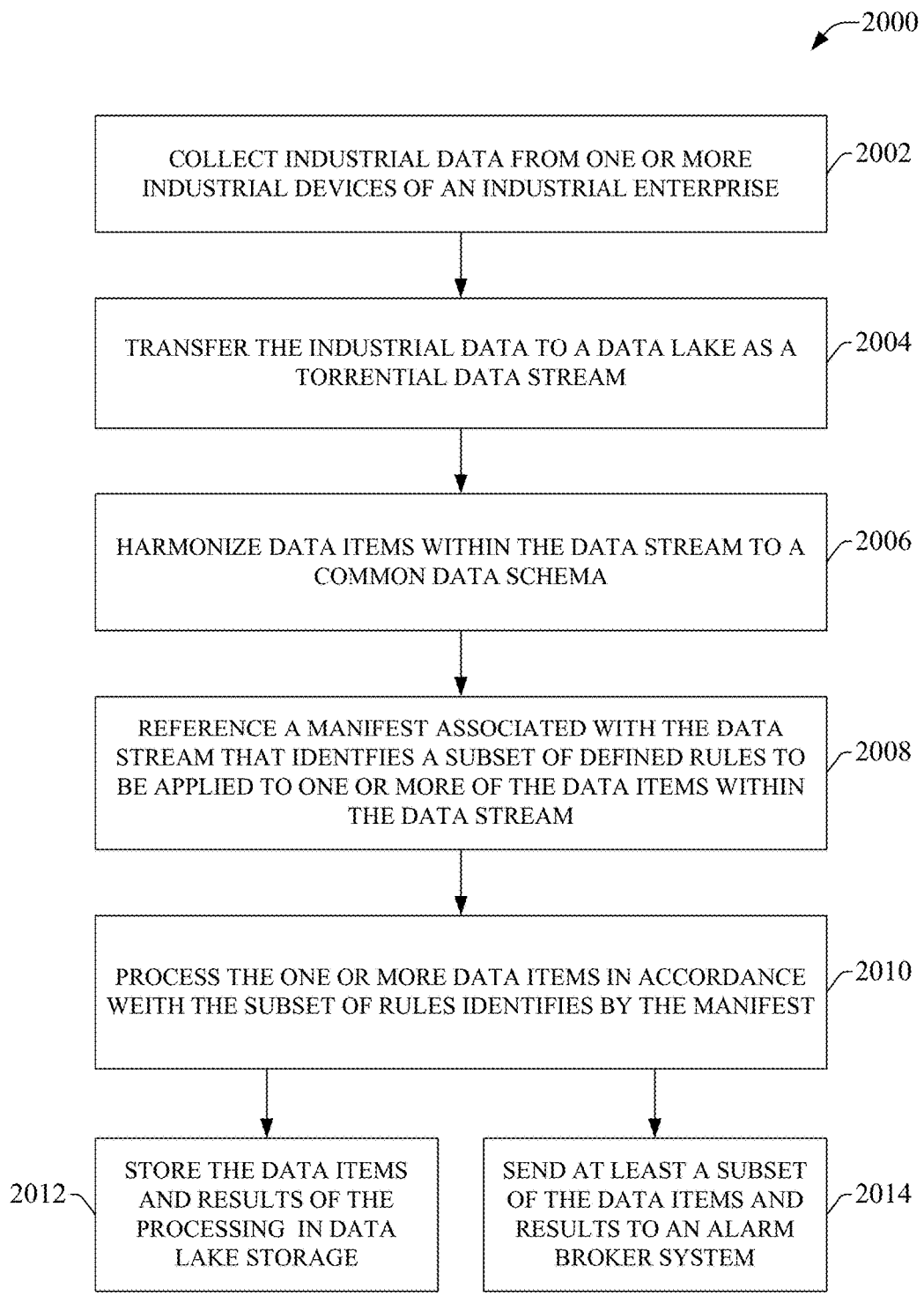
FIG. 20 is a flowchart of an example methodology for collecting and processing industrial data.

FIG. 20 illustrates a methodology in accordance with one or more embodiments of the subject application. While, for purposes of simplicity of explanation, the methodology shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 20 illustrates an example methodology 2000 for collecting and processing industrial data. Initially, at 2002, industrial data is collected from one or more industrial devices of an industrial enterprise. The industrial data can be received, for example, from one or more cloud agent devices located at a plant facility in which the industrial devices reside. At 2004, the industrial data is transferred to a data lake as a torrential data stream. In an example embodiment, produce and consume clients can be used to facilitate this data streaming. The industrial data is placed on a data stream that is dedicated to a particular industrial enterprise, plant facility, industrial system, and/or industrial device. Data items contained in the data stream can include, for example, alarm data, time-series sensor data, or other such information.

At 2006, data items within the data stream are harmonized to a common data schema to facilitate collective data processing. At 2008, a manifest associated with the data stream is referenced, the data manifest identifying a subset of defined rules to be applied to one or more of the data items within the data stream. The manifest can be uniquely associated with the industrial enterprise, plant facility, industrial system, and/or industrial device from which the data stream is received. At 2010, the one or more data items are processed in accordance with the subset of rules identified by the manifest, as determined based on the referencing at step 2008. Any type of processing can be carried out by the various applied rules. For example, alarm monitoring rules can be defined that generate a notification in response to determining that one or more of the data items in the data stream satisfy a defined criterion, and direct the notification to one or more technical specialists or other suitable personnel. Other rules can be used to calculate a defined metric based on specified data items of the data stream.

At 2012, the data items and results of the rules-based processing are stored in data lake storage for subsequent viewing or retrieval. Also, at 2014, at least a subset of the data items and results of the rules-based processing can be sent to an alarm broker system that facilitates matching identified alarm conditions to suitable experts capable of assisting the industrial enterprise in addressing the alarm conditions.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 21:
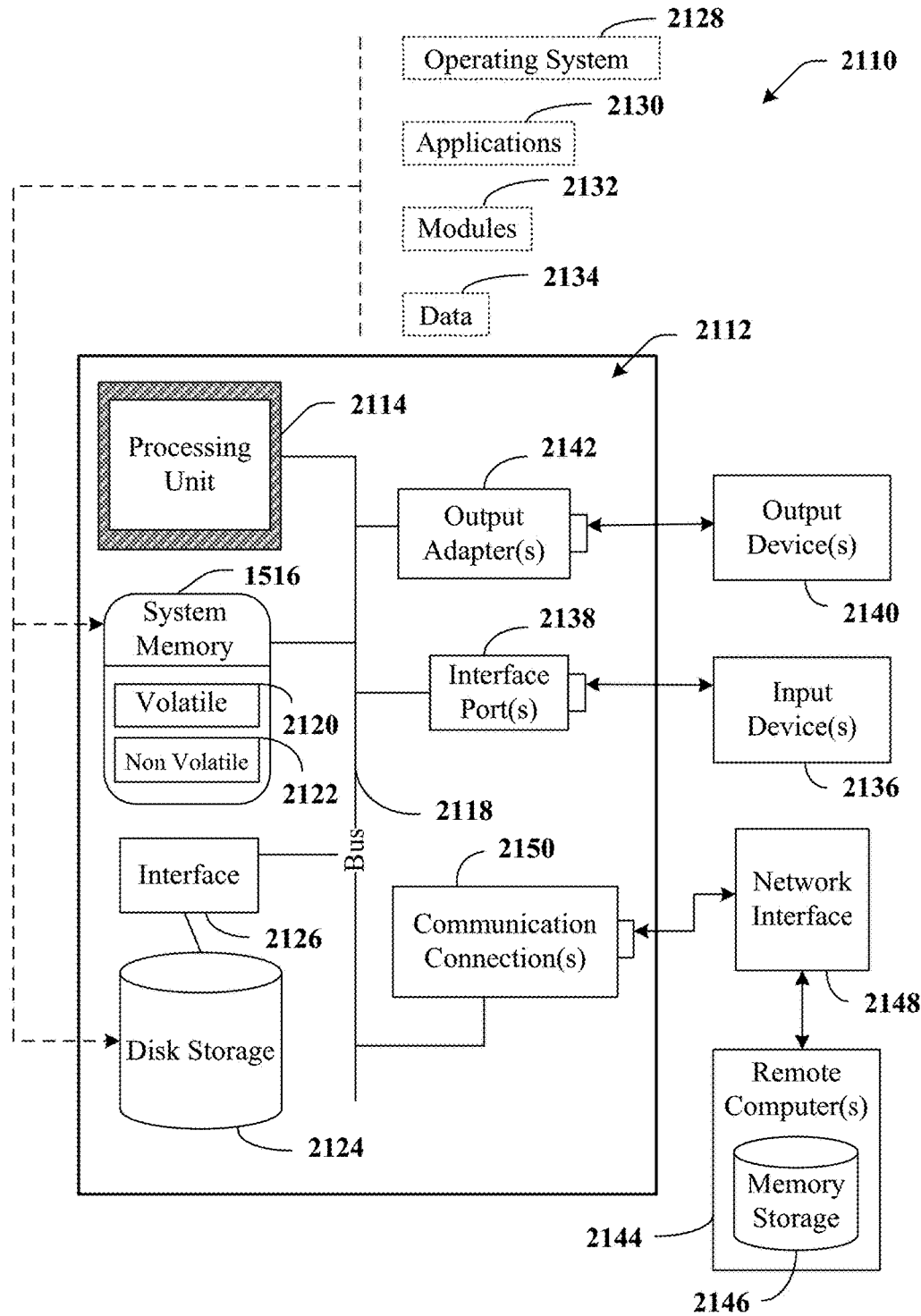
FIG. 21 is an example computing environment.
Figure 22:
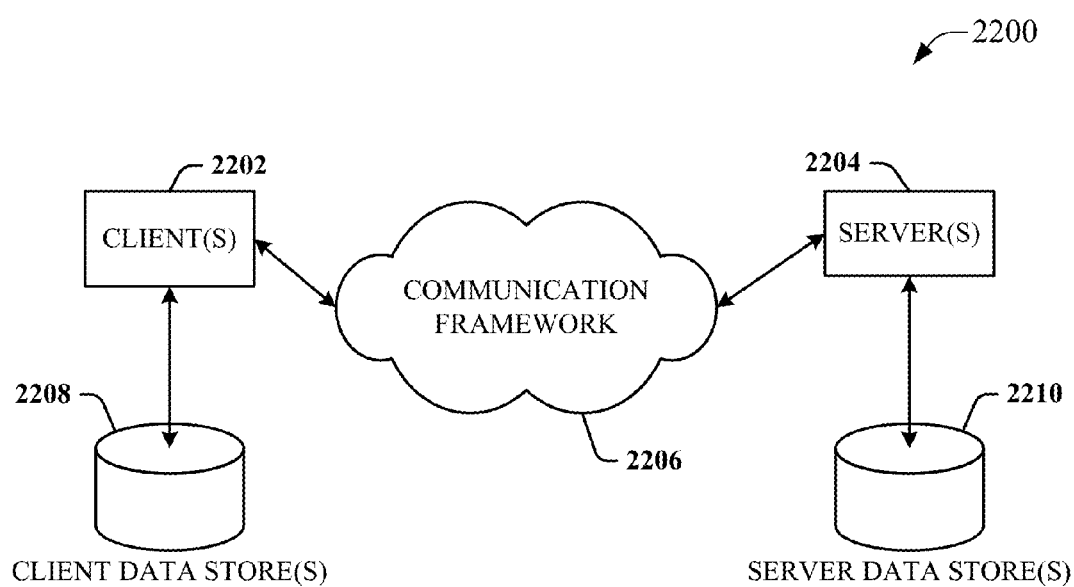
FIG. 22 is an example networking environment.

In order to provide a context for the various aspects of the disclosed subject matter, FIGS. 21 and 22 as well as the following discussion are intended to provide a brief, general description of a suitable environment in which the various aspects of the disclosed subject matter may be implemented.

With reference to FIG. 21, an example environment 2110 for implementing various aspects of the aforementioned subject matter includes a computer 2112. The computer 2112 includes a processing unit 2114, a system memory 2116, and a system bus 2118. The system bus 2118 couples system components including, but not limited to, the system memory 2116 to the processing unit 2114. The processing unit 2114 can be any of various available processors. Multi-core microprocessors and other multiprocessor architectures also can be employed as the processing unit 2114.

The system bus 2118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 2116 includes volatile memory 2120 and nonvolatile memory 2122. The basic input/output system (BIOS), containing the basic routines to transfer information between elements within the computer 2112, such as during start-up, is stored in nonvolatile memory 2122. By way of illustration, and not limitation, nonvolatile memory 2122 can include read only memory (ROM), programmable ROM (PROM), electrically programmable ROM (EPROM), electrically erasable PROM (EEPROM), or flash memory. Volatile memory 2120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2112 also includes removable/non-removable, volatile/nonvolatile computer storage media. FIG. 21 illustrates, for example a disk storage 2124. Disk storage 2124 includes, but is not limited to, devices like a magnetic disk drive, floppy disk drive, tape drive, Jaz drive, Zip drive, LS-100 drive, flash memory card, or memory stick. In addition, disk storage 2124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 2124 to the system bus 2118, a removable or non-removable interface is typically used such as interface 2126.

It is to be appreciated that FIG. 21 describes software that acts as an intermediary between users and the basic computer resources described in suitable operating environment 2110. Such software includes an operating system 2128. Operating system 2128, which can be stored on disk storage 2124, acts to control and allocate resources of the computer 2112. System applications 2130 take advantage of the management of resources by operating system 2128 through program modules 2132 and program data 2134 stored either in system memory 2116 or on disk storage 2124. It is to be appreciated that one or more embodiments of the subject disclosure can be implemented with various operating systems or combinations of operating systems.

A user enters commands or information into the computer 2112 through input device(s) 2136. Input devices 2136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2114 through the system bus 2118 via interface port(s) 2138. Interface port(s) 2138 include, for example, a serial port, a parallel port, a game port, and a universal serial bus (USB). Output device(s) 2140 use some of the same type of ports as input device(s) 2136. Thus, for example, a USB port may be used to provide input to computer 2112, and to output information from computer 2112 to an output device 2140. Output adapters 2142 are provided to illustrate that there are some output devices 2140 like monitors, speakers, and printers, among other output devices 2140, which require special adapters. The output adapters 2142 include, by way of illustration and not limitation, video and sound cards that provide a means of connection between the output device 2140 and the system bus 2118. It should be noted that other devices and/or systems of devices provide both input and output capabilities such as remote computer(s) 2144.

Computer 2112 can operate in a networked environment using logical connections to one or more remote computers, such as remote computer(s) 2144. The remote computer(s) 2144 can be a personal computer, a server, a router, a network PC, a workstation, a microprocessor based appliance, a peer device or other common network node and the like, and typically includes many or all of the elements described relative to computer 2112. For purposes of brevity, only a memory storage device 2246 is illustrated with remote computer(s) 2144. Remote computer(s) 2144 is logically connected to computer 2112 through a network interface 2148 and then physically connected via communication connection 2150. Network interface 2148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2150 refers to the hardware/software employed to connect the network interface 2148 to the system bus 2118. While communication connection 2150 is shown for illustrative clarity inside computer 2112, it can also be external to computer 2112. The hardware/software necessary for connection to the network interface 2148 includes, for exemplary purposes only, internal and external technologies such as, modems including regular telephone grade modems, cable modems and DSL modems, ISDN adapters, and Ethernet cards.

FIG. 22 is a schematic block diagram of a sample computing environment 2200 with which the disclosed subject matter can interact. The sample computing environment 2200 includes one or more client(s) 2202. The client(s) 2202 can be hardware and/or software (e.g., threads, processes, computing devices). The sample computing environment 2200 also includes one or more server(s) 2204. The server(s) 2204 can also be hardware and/or software (e.g., threads, processes, computing devices). The servers 2204 can house threads to perform transformations by employing one or more embodiments as described herein, for example. One possible communication between a client 2202 and servers 2204 can be in the form of a data packet adapted to be transmitted between two or more computer processes. The sample computing environment 2200 includes a communication framework 2206 that can be employed to facilitate communications between the client(s) 2202 and the server(s) 2204. The client(s) 2202 are operably connected to one or more client data store(s) 2208 that can be employed to store information local to the client(s) 1602. Similarly, the server(s) 2204 are operably connected to one or more server data store(s) 2210 that can be employed to store information local to the servers 2204.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system for collecting and analyzing industrial data, comprising:
    a memory that stores executable components;
    a processor, operatively coupled to the memory, that executes the executable components, the executable components comprising:
        a data streaming component configured to transfer industrial data collected from one or more industrial devices of an industrial enterprise to a cloud platform as a data stream, wherein the data stream is associated with the industrial enterprise;
        a harmonization component configured to add harmonization envelop data to respective data items of the data stream to yield harmonized data conforming to a common data schema; and
        an analytics component configured to reference a manifest associated with the industrial enterprise, to retrieve one or more analytic rules identified by the manifest from a rules store, and to apply the one or more analytic rules to one or more of the data items of the data stream to yield one or more analytic results,
    wherein
        the data streaming component is further configured to store the data items and the one or more analytic results on cloud-based storage, and
        the analytics component is further configured to, in response to determining that the one or more analytic results satisfy a criterion, generate and send modification data directed to an industrial device of the one or more industrial devices, the modification data configured to change a process control setpoint stored on the industrial device.

2. The system of claim 1, wherein the data streaming component is further configured to transfer multiple sets of industrial data collected from respective sets of industrial devices as multiple data streams, and the executable components further comprise a manifest component configured to create and store multiple manifests respectively associated with the multiple data streams.

3. The system of claim 1, wherein the executable components further comprise a user interface component configured to generate one or more interface displays that facilitate receipt of rule configuration input defining analytic rules, wherein the analytic rules include the one or more analytic rules.

4. The system of claim 3, the executable components further comprising a rules definition component configured to create and store the analytic rules in accordance with the rule configuration input.

5. The system of claim 4, wherein the user interface displays are configured to receive, as the rule configuration input, selection of a predefined rule to be associated with the data stream, and wherein the manifest component is further configured to, in response to receipt of the selection, update the manifest to include a reference to the predefined rule.

6. The system of claim 1, wherein
    the analytics component is further configured to, in response to determining that the one or more analytic results are indicative of an alarm condition, send information relating to the alarm condition to an alarm brokering system, and
    the alarm brokering system is configured to identify one or more technical experts based on the information and to send notification data identifying the alarm condition to the one or more technical experts.

7. The system of claim 1, wherein the one or more analytic rules comprise at least one of an alarm inhibit rule configured to inhibit one or more alarms represented by the one or more data items, a filtering rule configured to discard one or more of the data items based on a criterion defined by the filtering rule, or a monitoring rule configured to initiate an action in response to determining that the one or more data items satisfy a criterion defined by the monitoring rule.

8. The system of claim 1, wherein the harmonization envelope data comprises at least one of time zone information indicating a time zone in which the data items originated, technology information indicating a technology to which the data items relate, status information indicating a current service status of an alarm event indicated by the data items, mode information indicating a mode of the alarm event, or filter key information indicating a field of the data items to be used as a filter key for the data items.

9. A method for monitoring industrial data, comprising:
transferring, by a system comprising at least one processor, industrial data collected from one or more industrial devices of an industrial enterprise to cloud-based storage as a data stream, wherein the data stream is associated with the industrial enterprise;
appending, by the system, harmonization envelope data to data items of the data stream to yield harmonized data that conforms to a common data schema;
retrieving, by the system, a subset of analytic rules stored on cloud-based rule storage, wherein the subset of the analytic rules are identified by a manifest associated with the data stream;
processing, by the system, one or more of the data items in accordance with the one or more analytic rules to yield one or more analytic results;
storing, by the system, the data items and the one or more analytic results on the cloud-based storage; and
in response to determining that the one or more analytic results satisfy a criterion, generating and sending modification data directed to an industrial device of the one or more industrial devices, the modification data configured to change a process control setpoint of the industrial device.

10. The method of claim 9, further comprising:
transferring, by the system, multiple sets of industrial data collected from respective sets of industrial devices as multiple data streams; and
storing, by the system, multiple manifests in association with the multiple data streams, wherein each of the multiple manifest is associated with one of the multiple data streams.

11. The method of claim 9, further comprising:
generating, by the system, one or more interface displays configured to receive rule configuration input defining one or more of the analytic rules;
receiving the rule configuration input via interaction with the one or more interface displays; and
creating and storing the one or more analytic rules in accordance with the rule configuration input.

12. The method of claim 11, wherein the receiving the rule configuration input comprises receiving selection of a predefined rule to be associated with the data stream, and the method further comprises, in response to the receiving, modifying the manifest to add a reference to the predefined rule.

13. The method of claim 9, further comprising:
in response to determining that the one or more analytic results indicate an alarm condition on at least one of the one or more industrial devices, sending, by the system, information relating to the alarm condition to an alarm brokering system that sends notification data to one or more technical experts based on the information.

14. The method of claim 9, wherein the retrieving the subset of the analytic rules comprises retrieving at least one of an alarm inhibit rule configured to inhibit one or more alarms represented by one or more of the data items, a filtering rule configured to discard one or more of the data items based on a criterion defined by the filtering rule, or a monitoring rule configured to initiate an action in response to determining that one or more of the data items satisfy a criterion defined by the monitoring rule.

15. The method of claim 9, wherein the appending the harmonization envelope data comprises appending at least one of time zone information indicating a time zone in which the data items originated, technology information indicating a technology to which the data items relate, status information indicating a current service status of an alarm event indicated by the data items, mode information indicating a mode of the alarm event, or filter key information indicating a field of the data items to be used as a filter key for the data items.

16. A non-transitory computer-readable medium having stored thereon instructions that, in response to execution, cause a system comprising a processor to perform operations, the operations comprising:
transferring industrial data collected from one or more industrial devices of an industrial enterprise to cloud-based storage as a data stream, wherein the data stream is associated with the industrial enterprise;
appending harmonization envelope data to data items of the data stream to yield harmonized data that conforms to a common data schema;
referencing a manifest associated with the data stream to identify a subset of analytic rules stored on cloud-based rule storage;
processing one or more of the data items in accordance with the subset of analytic rules to yield one or more analytic results;
storing the data items and the one or more analytic results on cloud-based storage; and
in response to determining that the one or more analytic results satisfy a criterion, generating and sending modification data directed to an industrial device of the one or more industrial devices, wherein the modification data is configured to change a process control setpoint of the industrial device.

17. The non-transitory computer-readable medium of claim 16, the operations further comprising:
generating one or more interface displays configured to receive rule configuration input defining one or more of the analytic rules;
receiving the rule configuration input via interaction with the one or more interface displays; and
creating and storing the one or more analytic rules in accordance with the rule configuration input.

18. The non-transitory computer-readable medium of claim 17, wherein the receiving the rule configuration input comprises receiving selection of a predefined rule to be associated with the data stream, and the operations further comprise, in response to the receiving, modifying the manifest to add a reference to the predefined rule.

19. The non-transitory computer-readable medium of claim 16, wherein the appending the harmonization envelope data comprises appending at least one of time zone information indicating a time zone in which the data items originated, technology information indicating a technology to which the data items relate, status information indicating a current service status of an alarm event indicated by the data items, mode information indicating a mode of the alarm event, or filter key information indicating a field of the data items to be used as a filter key for the data items.

20. The non-transitory computer-readable medium of claim 16, wherein the subset of the analytic rules comprises retrieving at least one of an alarm inhibit rule configured to inhibit one or more alarms represented by one or more of the data items, a filtering rule configured to discard one or more of the data items based on a criterion defined by the filtering rule, or a monitoring rule configured to initiate an action in response to determining that one or more of the data items satisfy a criterion defined by the monitoring rule.

* * * * *